US009533738B2

(12) United States Patent
Tominaga

(10) Patent No.: US 9,533,738 B2
(45) Date of Patent: Jan. 3, 2017

(54) FLOATING BODY STRUCTURE

(71) Applicant: NIPPON STEEL & SUMITOMO METAL CORPORATION, Tokyo (JP)

(72) Inventor: Tomonori Tominaga, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/651,323

(22) PCT Filed: Mar. 31, 2014

(86) PCT No.: PCT/JP2014/059407
§ 371 (c)(1),
(2) Date: Jun. 11, 2015

(87) PCT Pub. No.: WO2014/163032
PCT Pub. Date: Oct. 9, 2014

(65) Prior Publication Data
US 2015/0329180 A1 Nov. 19, 2015

(30) Foreign Application Priority Data

Apr. 1, 2013 (JP) ................................. 2013-076294

(51) Int. Cl.
B63B 5/20 (2006.01)
B63B 35/44 (2006.01)
(Continued)

(52) U.S. Cl.
CPC . *B63B 5/20* (2013.01); *B63B 1/10* (2013.01); *B63B 1/107* (2013.01); *B63B 1/12* (2013.01);
(Continued)

(58) Field of Classification Search
CPC ........ B63B 2035/446; B63B 5/14; B63B 5/16; B63B 5/18; B63B 5/20; B63B 2701/04; B63B 2231/60; B63B 2231/62; B63B 2231/64; B63B 2231/66; B63B 2231/68
See application file for complete search history.

(56) References Cited

U.S. PATENT DOCUMENTS 3,860,983 A * 1/1975 Furth ..................... B63B 22/02
114/333
2012/0139255 A1 6/2012 Zhu
2014/0196654 A1 7/2014 Roddier et al.

FOREIGN PATENT DOCUMENTS

CN 102015435 A 4/2011
CN 102060088 A 5/2011
(Continued)

OTHER PUBLICATIONS

Chinese Office Action and Search Report, dated Nov. 20, 2015, for Chinese Application. No. 201480003675.X, with a partial English translation.
(Continued)

*Primary Examiner* — Andrew Polay
(74) *Attorney, Agent, or Firm* — Birch, Stewart, Kolasch & Birch, LLP

(57) ABSTRACT

The floating body structure is a floating body structure that supports an object to be supported so that the object to be supported floats in the sea, including a floating body section connected to a base end portion of the object to be supported, wherein the floating body section has a lid body made of steel, an outer pipe made of steel, and an inner pipe made of steel and provided inside the outer pipe, and the floating body section is hermetically sealed by the lid body in a state where at least a portion of a gap formed between an outer wall surface of the inner pipe and an inner wall surface of the outer pipe is filled with concrete or mortar.

19 Claims, 20 Drawing Sheets

(51) Int. Cl.
  *B63B 1/10* (2006.01)
  *B63B 1/12* (2006.01)
  *B63B 1/04* (2006.01)
  *B63B 43/06* (2006.01)

(52) U.S. Cl.
  CPC ............... *B63B 35/44* (2013.01); *F03D 13/20* (2016.05); *B63B 1/04* (2013.01); *B63B 43/06* (2013.01); *B63B 2001/128* (2013.01); *B63B 2035/446* (2013.01); *F05B 2240/40* (2013.01); *F05B 2240/93* (2013.01); *F05B 2240/95* (2013.01); *Y02E 10/725* (2013.01); *Y02E 10/727* (2013.01)

(56) References Cited

FOREIGN PATENT DOCUMENTS

| | | |
|---|---|---|
| DE | 10337997 A1 | 3/2005 |
| EP | 2 672 012 A1 | 12/2013 |
| GB | 2166090 B | 3/1988 |
| JP | 2004-19470 A | 1/2004 |
| JP | 2005-330675 A | 12/2005 |
| JP | 2009-18671 A | 1/2009 |
| JP | 2009-248792 A | 10/2009 |
| JP | 2010-223113 A | 10/2010 |
| JP | 2010-234965 A | 10/2010 |
| JP | 2011-207446 A | 10/2011 |
| JP | 2012-25272 A | 2/2012 |
| JP | 5022976 B2 | 9/2012 |
| JP | 2013-7251 A | 1/2013 |
| WO | WO 2010/093259 A2 | 8/2010 |
| WO | WO 2012/118186 A1 | 9/2012 |
| WO | WO 2012/169914 A8 | 12/2012 |

OTHER PUBLICATIONS

International Search Report, issued in PCT/JP2014/059407, dated Jun. 24, 2014.

Written Opinion of the International Searching Authority, issued in PCT/JP2014/059407, dated Jun. 24, 2014.

* cited by examiner

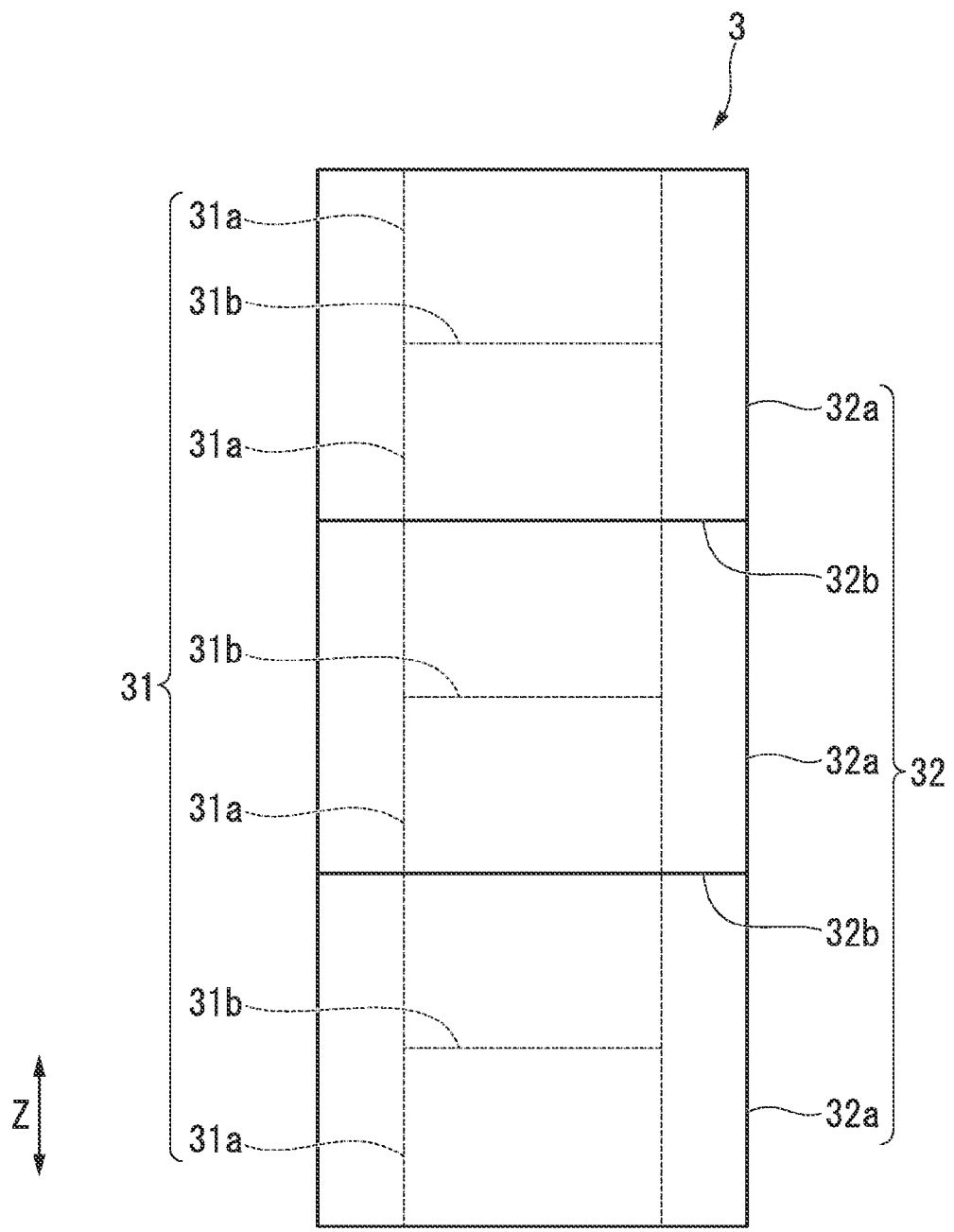

FLOATING BODY STRUCTURE

TECHNICAL FIELD OF THE INVENTION

The present invention relates to a floating body structure which supports an object to be supported such as a wind turbine generator so that the object to be supported floats in the sea.

Priority is claimed on Japanese Patent Application No. 2013-076294, filed on Apr. 1, 2013, the content of which is incorporated herein by reference.

RELATED ART

Conventionally, regarding power generation methods, there are power generation by burning fossil fuels, nuclear power generation, power generation using renewable energy, and the like. Among these, in power generation by burning fossil fuels, a disadvantage that there is a concern that it may cause global warming, depletion of fossil fuels, or the like has been pointed out. Further, in nuclear power generation, it has been pointed out that when an accident occurs in a power plant, it causes an enormous amount of damage.

In contrast, in power generation using renewable energy, there are no disadvantages related to, for example, global warming, fossil fuel depletion, and long-lasting damage after accidents, and therefore, the construction of power generation systems using renewable energy is urgently being promoted on a global scale. As power generation systems using renewable energy, wind-power generation which generates electric power by a wind turbine generator in which a blade is rotated by wind desirably includes the wind turbine generator installed in the open sea where strong wind is more reliably supplied.

As for main methods of installing the wind turbine generator in the sea, there are a method of extending a support structure from a foundation pile driven into the seabed to the surface of the sea and installing the wind turbine generator above the support structure extending to the surface of the sea, and a method of installing the wind turbine generator above a floating body structure floated in the sea. In the open sea in which the wind turbine generator is installed, the length of the support structure becomes longer as the water depth becomes deeper, and thus the installation costs of the wind turbine generator and the like are increased, and therefore, it is difficult to adopt this method of installing the wind turbine generator above the support structure extending to the surface of the sea. Therefore, as a method of installing the wind turbine generator in the sea, it is desirable to adopt a method of installing the wind turbine generator above the floating body structure floated in the sea.

In this manner, as a floating body type wind turbine power-generating facility in which the wind turbine generator is installed above the floating body structure floated in the sea, for example, a pontoon type floating body type wind turbine power-generating facility as disclosed in Patent Document 1 below or a spar type floating body type wind turbine power-generating facility as disclosed in Patent Documents 2 to 4 below is proposed.

PRIOR ART DOCUMENTS

Patent Documents

[Patent Document 1] Japanese Unexamined Patent Application, First Publication No. 2004-19470

[Patent Document 2] Japanese Unexamined Patent Application, First Publication No. 2010-223113

[Patent Document 3] Japanese Unexamined Patent Application, First Publication No. 2012-25272

[Patent Document 4] Japanese Unexamined Patent Application, First Publication No. 2009-248792

DISCLOSURE OF THE INVENTION

Problems to be Solved by the Invention

The technique disclosed in Patent Document 1 is to provide a plurality of main buoyancy sections at a base end portion of a wind turbine generator and connect these main buoyancy sections by a connection buoyancy section. In the technique disclosed in Patent Document 1, the main buoyancy sections and the connection buoyancy section are floated with only lower portions thereof sunk under water. At this time, since the connection buoyancy section connects the plurality of main buoyancy sections along the surface of the sea, an area which faces sea waves is large. Further, since the main buoyancy sections and the connection buoyancy section are floated at the surface of the sea, the main buoyancy sections and the connection buoyancy section directly receive the energy of sea waves. Therefore, in the pontoon type floating body structure disclosed in Patent Document 1, there is a problem in that in a case of being installed in the open sea where the energy of sea waves is large, the entire structure easily becomes unstable due to the influence of sea waves.

Further, in the technique disclosed in Patent Document 1, in order to reduce the influence of sea waves, a method of floating the main buoyancy sections and a connection buoyancy section 90 with the whole sunk under water at a predetermined water depth by reducing the buoyancy of the main buoyancy sections and the connection buoyancy section 90 is also conceivable. However, the height of the wind turbine generator sometimes reaches about 120 m above the surface of the sea, and the water depth of a location where the whole of the main buoyancy sections and the connection buoyancy section 90 is sunk and floated in water is usually in a range of 15 m to 20 m as the height of the wind turbine generator becomes higher, and there is also a case where the maximum of the water depth exceeds 60 m. In this case, as shown in FIG. 20, in the technique disclosed in Patent Document 1, the cross-sectional shape of the connection buoyancy section 90 is a rectangular shape. Therefore, there is a problem that large equivalent stress is easily generated in corner portions of the rectangular cross section of the connection buoyancy section 90 and a central portion of each side of the rectangular cross section in a case where large water pressure acts at a location where the water depth is deep.

In addition, in order to secure structural strength capable of countering the water pressure, a method of thickening walls of the main buoyancy section and the connection buoyancy section 90, or a method of providing a stiffener 92 perpendicular to a wall surface inside a wall is also conceivable. However, in these methods, there is a problem that, for example, in a case where steel is used for the wall, the amount of steel used increases, and thus the manufacturing costs of the main buoyancy section and the connection buoyancy section 90 increase.

Further, in a case where spaces inside the walls of the main buoyancy sections and the connection buoyancy section 90 are totally filled with concrete in order to secure structural strength capable of countering the water pressure, the weight of the main buoyancy sections and the connection buoyancy section 90 increases, and thus there is a problem in that the buoyancy needed to float the main buoyancy sections and the connection buoyancy section 90 at a predetermined water depth is not obtained.

Patent Document 2 discloses a spar type floating body type wind turbine power-generating facility. A floating body section of the wind turbine power-generating facility is composed of concrete precast tubular bodies stacked in a plurality of stages in a height direction and integrated by tightly linking the respective precast tubular bodies by PC steel, and has a bottomed hollow portion having an open upper end portion. In this case, the floating body section has sufficient performance during wind-power generation operation. However, there is a problem during construction.

In stacking the precast tubular bodies and performing tight linking by the PC steel in the air, there are a case of stacking the precast tubular bodies in a longitudinal direction and a case of making the precast tubular bodies lie sideways and arranging the precast tubular bodies. In a case of stacking the precast tubular bodies in the longitudinal direction, a tower is further built on the floating body, and thus a very high crane is required, and therefore, it is difficult to cope with an increase in the size of a wind turbine. Further, in a case of making the precast tubular bodies lie sideways and of arranging the precast tubular bodies, the problem of the height of a crane is resolved. However, since the total weight of the precast tubular bodies is very heavy, a large moment acts on the floating body section when standing each of the precast tubular bodies on the floating body section. In order to secure sufficient strength against the large moment, a large amount of PC steel is required.

In a case where cracks or the like occur in the floating body section due to insufficient flexural strength when standing each of the precast tubular bodies on the floating body section, thereafter, during wind-power generation operation, the floating body section is present in water, thereby receiving water pressure. The water pressure acts on the floating body section as horizontal prestress. However, hardly any of this effect can be expected in the vertical direction. For this reason, there is no action of closing the generated cracks, and thus the floating body section has a problem in durability or the like. That is, the technique disclosed in Patent Document 2 is a technique having a limit with respect to an increase in the size of a structure.

The spar type floating body structure disclosed in Patent Document 3 includes: a cylindrical column section having a peripheral surface exposed to a waterline at the time of floating; a ballast section disposed at a lower portion of the column section; and a flange section disposed at an intermediate portion of the column section. The floating body structure configured in this manner is developed for the purpose of facilitating the installation or the maintenance of the floating body structure by a working ship and is not intended to solve a durability problem associated with an increase in size.

The spar type floating body structure disclosed in Patent Document 4 includes: a hollow lower floating body made by joining upper and lower lid bodies to a tubular precast concrete block continuously installed between the lid bodies using PC steel; a hollow upper floating body joined to the lower floating body using PC steel and composed of an upper lid and a precast concrete block having a smaller diameter than the precast concrete block described above; and a ballast tank joined to the lower surface of the lower floating body through a connecting steel pipe.

As described above, in a case where the floating body structure is configured of the PC steel, since a tensile force must not act on the surface of the concrete, a very large amount of PC steel is required. In particular, during the construction of the floating body structure, it is necessary to perform the transportation, the landing on the water, or the sinking of the floating body structure in a state where the floating body structure is lying sideways. Therefore, a very large bending moment acts on the structure configured of the heavy PC steels. In this manner, the spar type floating body structure disclosed in Patent Document 4 is also not intended to solve the durability problem associated with an increase in size.

The present invention has been made in view of the above-mentioned circumstances and has an object to provide a floating body structure in which it is possible to secure structural strength capable of countering water pressure without increasing the amount of steel or the like which is used in a wall, even in a case where the floating body stricture is floated in water with the whole of the floating body structure sunk under water at a predetermined water depth in order to reduce the influence of sea waves, and it becomes possible to obtain the buoyancy needed to float the floating body structure at a predetermined water depth, and which has a larger flexural strength.

Measures for Solving the Problem

The present invention adopts the following measures in order to achieve the above object by solving the above-described problems.

(1) A floating body structure according to an aspect of the present invention is a floating body structure that supports an object to be supported so that the object to be supported floats in the sea, including a floating body section connected to a base end portion of the object to be supported, wherein the floating body section has a lid body made of steel, an outer pipe made of steel, and an inner pipe made of steel and provided inside the outer pipe, and the floating body section is hermetically sealed by the lid body in a state where at least a portion of a gap formed between an outer wall surface of the inner pipe and an inner wall surface of the outer pipe is filled with concrete or mortar.

(2) In the floating body structure according to the above (1), the inner pipe may have a first joint portion that joins a plurality of steel pipes for inner pipe each having a predetermined length along a longitudinal direction of the floating body section, the outer pipe may have a second joint portion that joins a plurality of steel pipes for outer pipe each having a predetermined length along the longitudinal direction, and the first joint portion and the second joint portion may be alternately disposed in the longitudinal direction.

(3) In the floating body structure according to the above (2), each of the steel pipe for inner pipe and the steel pipe for outer pipe may be a spiral steel pipe obtained by press-forming a steel strip into a cylindrical shape by spirally bending the steel strip.

(4) In the floating body structure according to the above (1), each of the inner pipe and the outer pipe may be a spiral steel pipe obtained by press-forming a steel strip into a cylindrical shape by spirally bending the steel strip.

(5) In the floating body structure according to any one of the above (1) to (4), the base end portion of the object to be supported may penetrate toward the inside of the inner pipe from the outside in a radial direction of the inner pipe and the outer pipe and a hollow portion which is formed by an inner wall surface of the inner pipe may be filled with concrete or mortar at a position where the base end portion penetrates.

(6) In the floating body structure according to any one of the above (1) to (5), the inner pipe may be an extended portion of the base end portion of the object to be supported.

(7) In the floating body structure according to any one of the above (1) to (5), the base end portion of the object to be supported may be inserted into the inner pipe and a hollow portion which is formed by an inner wall surface of the inner pipe may be filled with concrete or mortar at a position where the base end portion is inserted.

(8) The floating body structure according to any one of the above (1) to (7), a plurality of the floating body sections may be provided and the plurality of floating body sections may be connected to each other by a floating body connecting section.

(9) In the floating body structure according to any one of the above (1) to (8), the gap between the outer wall surface of the inner pipe and the inner wall surface of the outer pipe may be 600 mm or more, and at least a portion of an outer diameter of the outer pipe may be 6500 mm or more.

Effects of the Invention

According to the floating body structure according to the aspect of the above (1), it is possible to secure structural strength capable of countering water pressure without increasing the amount of steel or the like which is used in a wall, even in a case where the floating body structure is floated in water with the whole sunk under water at a predetermined water depth in order to reduce the influence of sea waves, and it becomes possible to obtain the buoyancy needed to float the floating body structure at a predetermined water depth. In addition, it becomes possible to secure sufficient flexural strength.

In particular, according to the floating body structure according to the aspect of the above (2), the position of the first joint portion of the inner pipe is at a steel sheet portion of the outer pipe at the same position in the longitudinal direction and the position of the second joint portion of the outer pipe is at a steel sheet portion of the inner pipe at the same position in the longitudinal direction, and thus a configuration is made in which the first joint portion of the inner pipe and the second joint portion of the outer pipe are not present in the same cross section in the longitudinal direction. Due to this, it is possible to disperse joint portions which would likely lower total strength if in the same cross section, and thus it becomes possible to prevent the breakage of the floating body section having a double pipe structure.

In particular, according to the floating body structure according to the aspect of the above (3), welding of the inner pipe and the outer pipe in the longitudinal direction is replaced by a spiral bead. Welding of the spiral bead is welding automated in a factory, and therefore, it becomes possible to provide a floating body section having a double pipe structure with a reduced manufacturing cost. In addition, the spiral bead acts as a shift stop, and therefore, the spiral bead contributes to the combining of internal concrete and a steel pipe portion, and thus it becomes possible to obtain higher structural strength.

BRIEF DESCRIPTION OF THE DRAWINGS

FIG. 9 is a side view of the floating body structure according to the first embodiment of the present invention.

EMBODIMENTS OF THE INVENTION

Hereinafter, floating body structures according to embodiments of the present invention will be described in detail with reference to the drawings.

Figure 1:
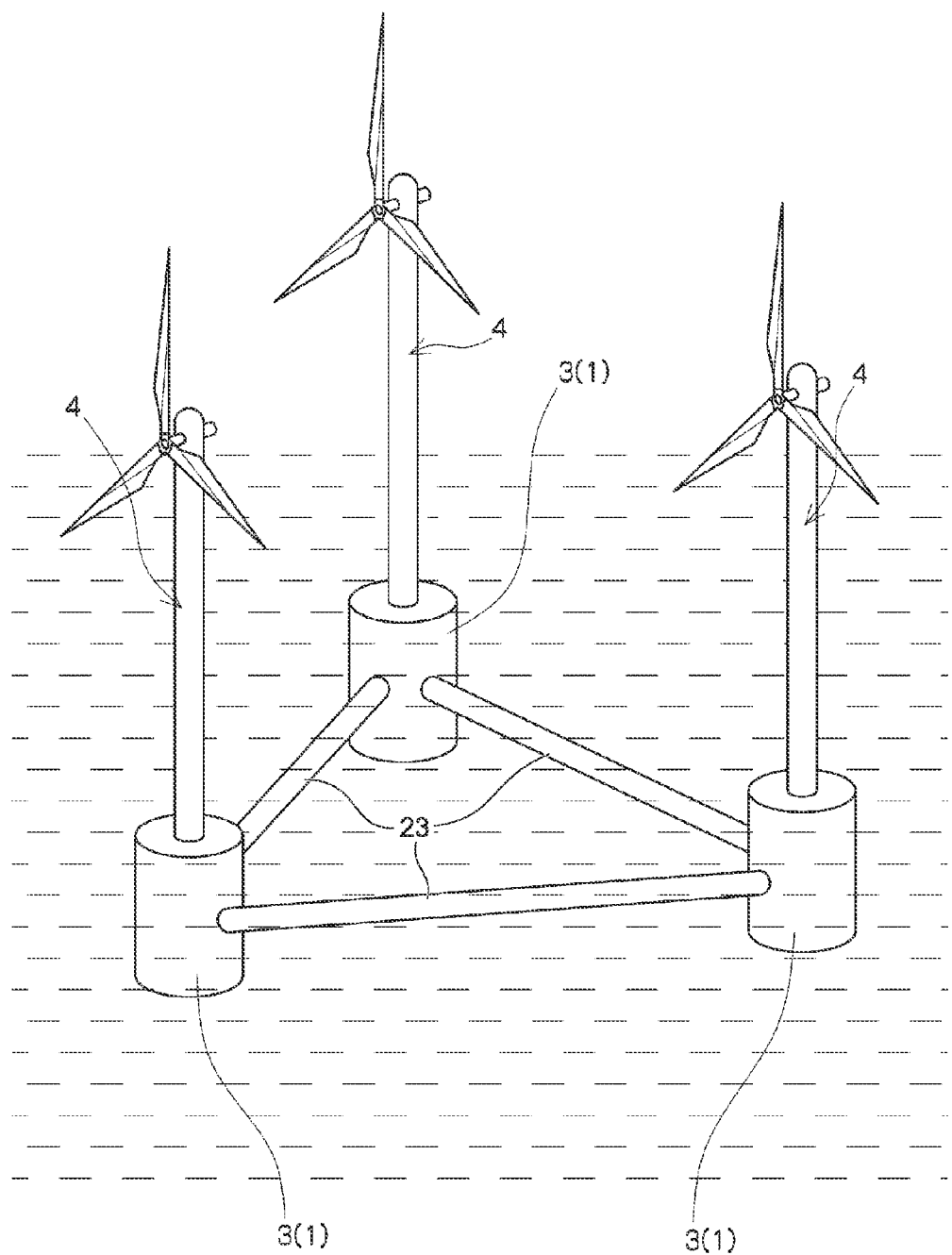
FIG. 1 is a perspective view schematically showing the configuration of a floating body type wind turbine power-generating facility provided with a floating body structure according to a first embodiment of the present invention.
Figure 2:
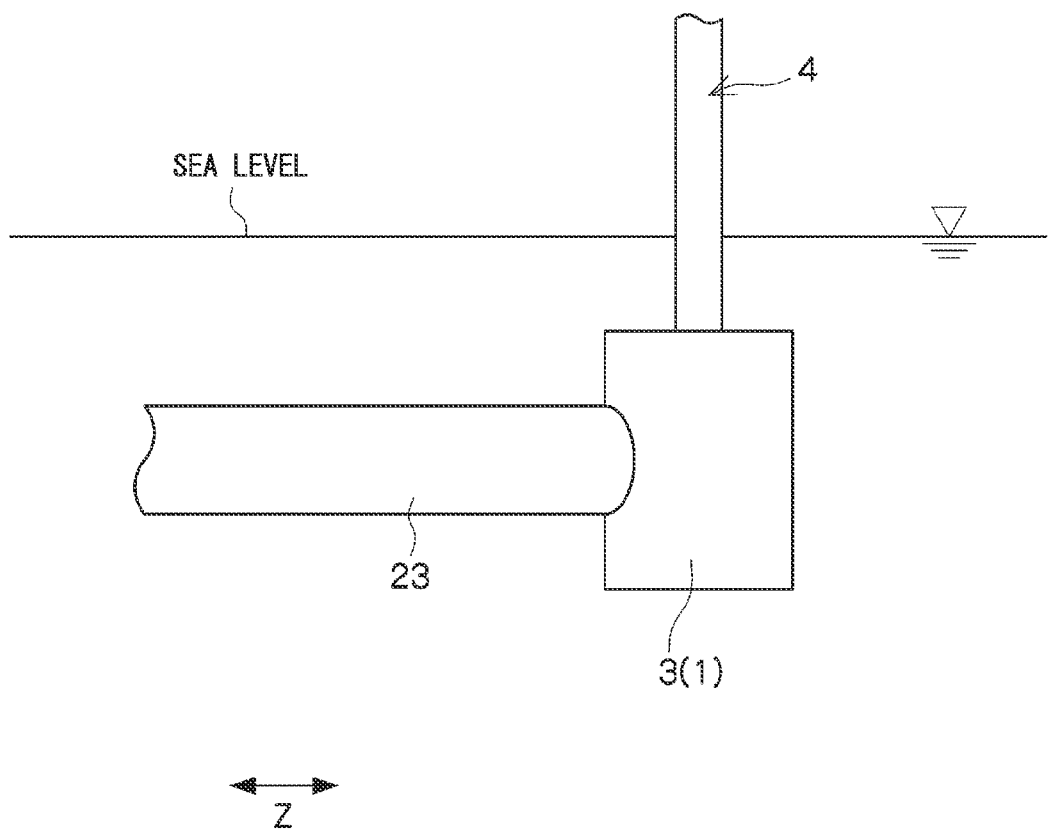
FIG. 2 is a side view showing the floating body structure according to the first embodiment of the present invention.

As shown in FIGS. 1 and 2, a floating body structure 1 according to a first embodiment of the present invention supports an object to be supported (superstructure 4) such as a wind turbine generator so that the superstructure 4 floats in the sea, and is provided below the superstructure 4 in association with the superstructure 4. The floating body structure 1 is floated in water in a state where the whole of the floating body structure 1 is sunk under water at a predetermined water depth, and at least a portion of the superstructure 4 is installed above a surface of the sea due to the buoyancy of the floating body structure 1. The floating body structure 1 is moored at a predetermined location in water by a mooring cable (not shown).

Figure 3:
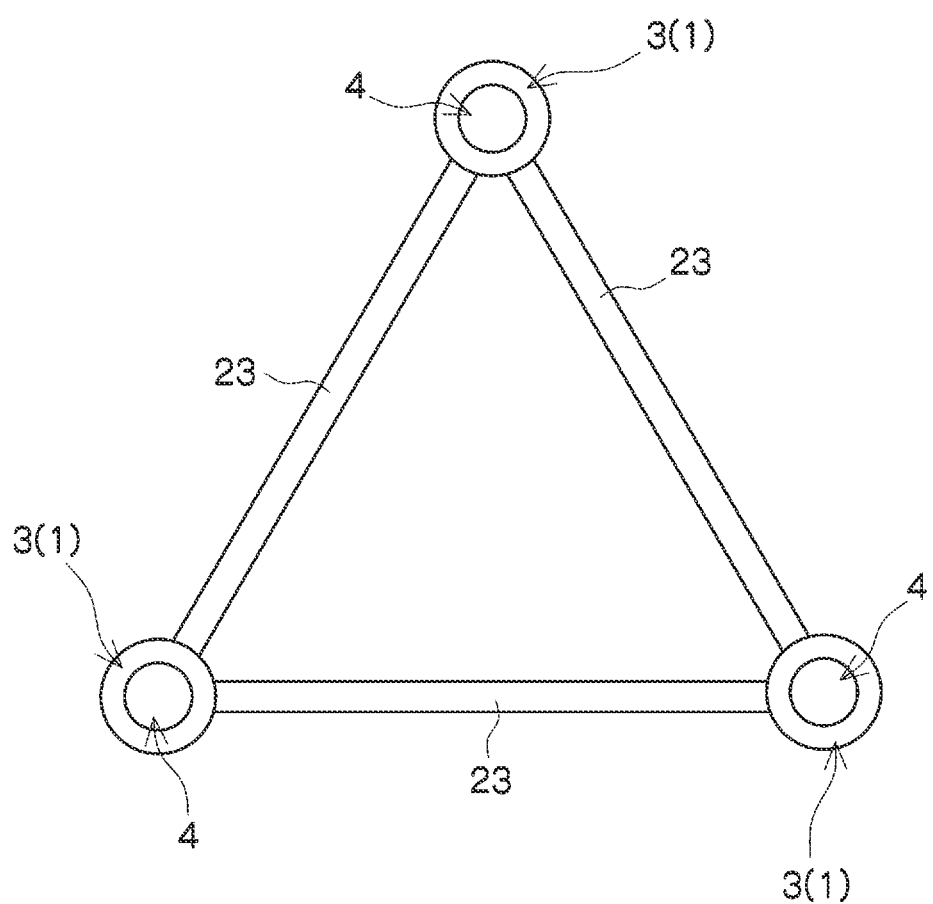
FIG. 3 is a plan view showing the floating body structure according to the first embodiment of the present invention.

The floating body structure 1 includes a floating body section 3 connected to a base end portion 4a of the superstructure 4. For example, in a case where there are three superstructures 4, as shown in FIGS. 1 and 3, the floating body structure 1 includes three floating body sections 3. In this case, the floating body structure 1 is formed in a substantially triangular planar shape with the three floating body sections 3 configured to support the three superstructures 4 as the apexes of the triangular planar shape and three floating body connecting sections 23 connecting the floating body sections 3 as three sides of the triangular planar shape.

Figure 4A:
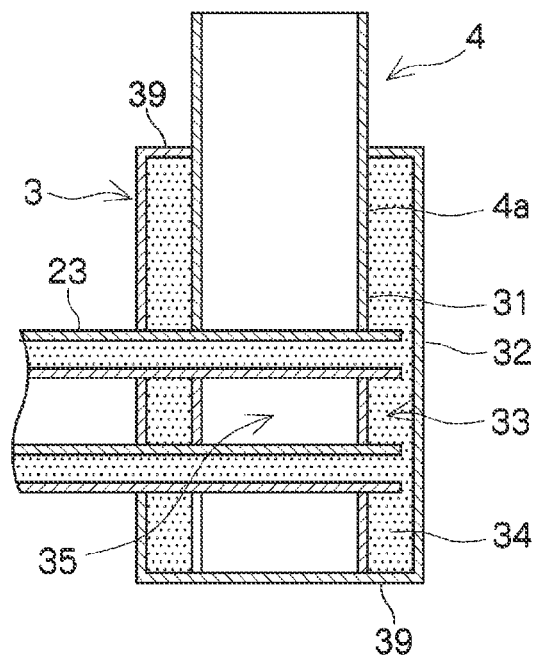
FIG. 4A is a longitudinal cross-sectional side view showing a state where a superstructure (an object to be supported) is mounted on a floating body section (a diagram showing a case where an inner pipe is continuous with the superstructure), with regard to the floating body structure according to the first embodiment of the present invention.
Figure 4B:
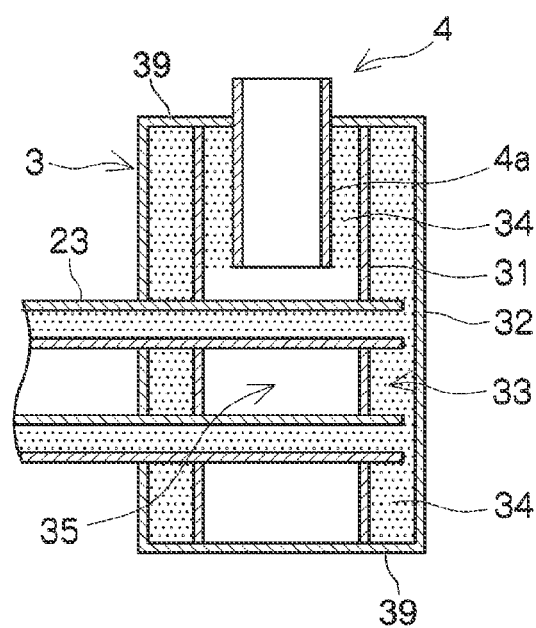
FIG. 4B is a longitudinal cross-sectional side view showing a state where the superstructure (the object to be supported) is mounted on the floating body section (a diagram showing a case where the superstructure is inserted into the inner pipe), with regard to the floating body structure according to the first embodiment of the present invention.
Figure 6:
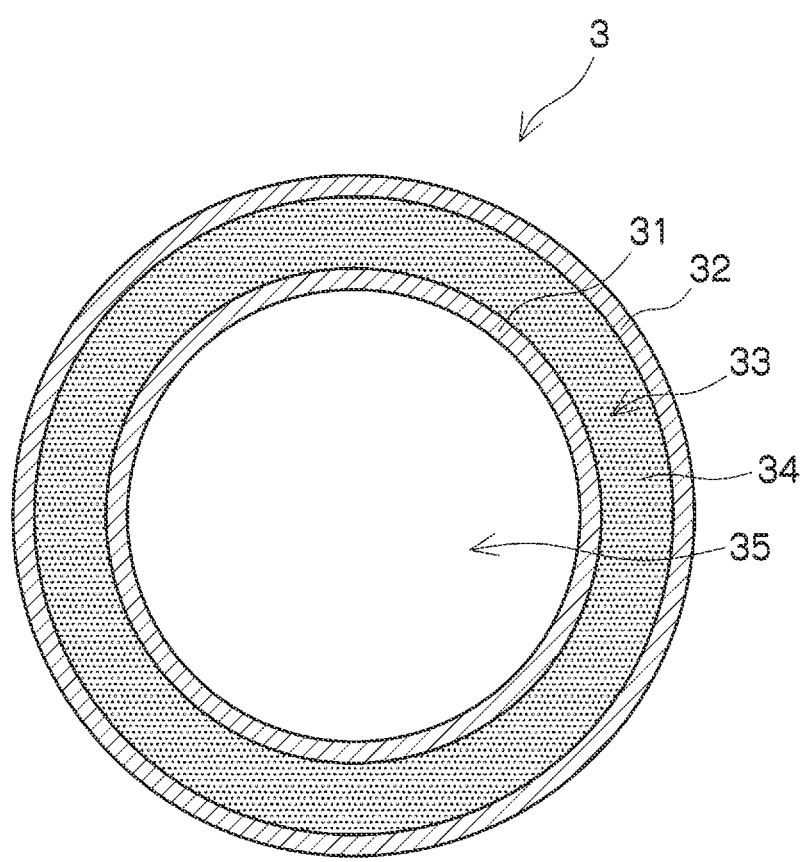
FIG. 6 is a longitudinal cross-sectional view of the floating body section of the floating body structure according to the first embodiment of the present invention.

As shown in FIG. 6, the floating body section 3 has a substantially cylindrical double pipe structure having a substantially cylindrical inner pipe 31 made of steel, which is provided on the inside, and a substantially cylindrical outer pipe 32 made of steel, which is provided on the outside. Further, as shown in FIGS. 4A and 4B, the floating body section 3 includes a lid body 39 made of steel. The floating body section 3 is hermetically sealed by the lid bodies 39 in a state where at least a portion of a gap 33 formed between the outer wall surface of the inner pipe 31 and the inner wall surface of the outer pipe 32 is filled with concrete or mortar 34. That is, each of an upper end of the floating body section 3 and a lower end of the floating body section 3 is closed by the lid body 39. The floating body section 3 has a hollow portion 35 formed on the inside by the inner wall surface of the inner pipe 31.

In addition, the entirety of the gap 33 may be filled with the concrete or mortar 34. Otherwise, a configuration is also acceptable in which a portion of the gap 33 is filled with the concrete or mortar 34 and the remaining space is used as a space configured to be filled with ballast. Further, a supporting member configured to support the inner pipe 31 may be provided in the gap 33 between the outer wall surface of the inner pipe 31 and the inner wall surface of the outer pipe 32. In addition, each of the inner pipe 31 and the outer pipe 32 is not limited to a cylindrical pipe and may be, for example, an elliptical pipe or a polygonal pipe.

Figure 5A:
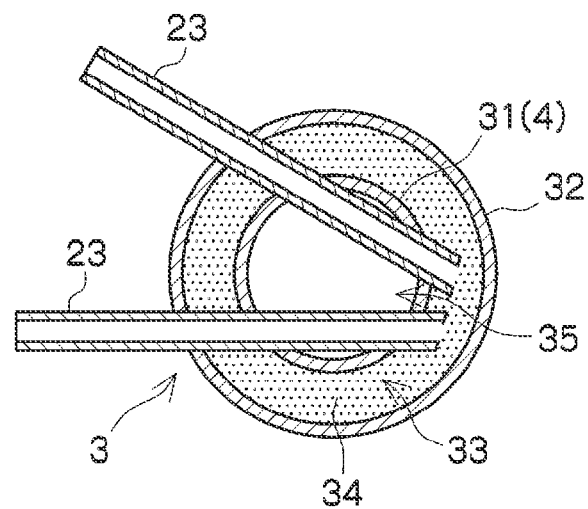
FIG. 5A is a transverse cross-sectional plan view showing a state where the superstructure is mounted on the floating body section (a diagram showing a case where the inner pipe is continuous with the superstructure), with regard to the floating body structure according to the first embodiment of the present invention.

As shown in FIGS. 4A and 5A, the floating body section 3 may be continuous with the superstructure 4 in a form in which the inner pipe 31 is extended. In other words, the inner pipe 31 may be an extended portion of the base end portion 4a of the superstructure 4.

Figure 5B:
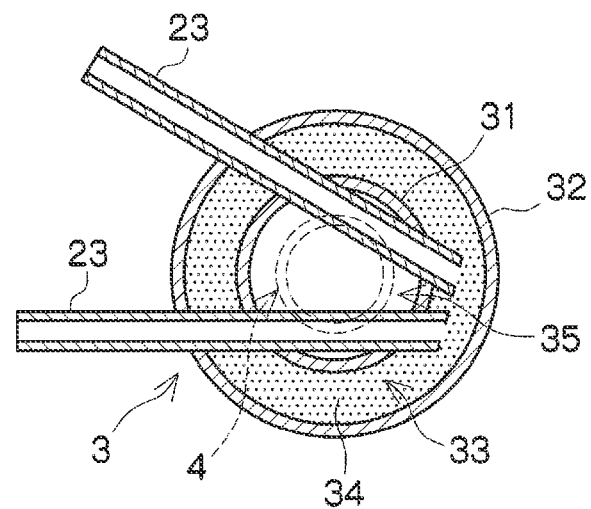
FIG. 5B is a transverse cross-sectional side view showing a state where the superstructure (the object to be supported) is mounted on the floating body section (a diagram showing a case where the superstructure is inserted into the inner pipe), with regard to the floating body structure according to the first embodiment of the present invention.

Further, as shown in FIGS. 4B and 5B, the base end portion 4a of the superstructure 4 may be inserted into the inside (the hollow portion 35) of the inner pipe 31. In this case, as shown in FIG. 4B, the inner pipe 31 and the base end portion 4a are joined to each other by filling the space between the inner pipe 31 and the base end portion 4a with the concrete or mortar 34. However, the inner pipe 31 and the base end portion 4a may be joined to each other by using bolts or welding. In a case where the inner pipe 31 and the base end portion 4a are joined to each other by filling the space between the inner pipe 31 and the base end portion 4a with the concrete or mortar 34, a stud, a weld bead, or the like is disposed on the steel surface which contacts with the concrete or mortar 34 as a shift stop, whereby it is possible to shorten the length of a joint portion.

The floating body sections 3 are connected to each other by the floating body connecting section 23. However, the floating body connecting section 23 may be joined to the outer pipe 32 of the floating body section 3 by welding or bolts. Further, as shown in FIGS. 4A, 4B, 5A, and 5B, the floating body connecting section 23 can also be stuck from the side of the floating body section 3 and then joined to the floating body section 3. In addition, the floating body connecting section 23 may have a double pipe structure composed of an inner pipe and an outer pipe, similar to the floating body section 3, or may have a general single pipe structure. In a case of adopting a double pipe structure as the structure of the floating body connecting section 23, at least a portion of the gap between an inner pipe and an outer pipe may be filled with concrete or mortar, in a manner similar to the floating body section 3.

Figure 7:
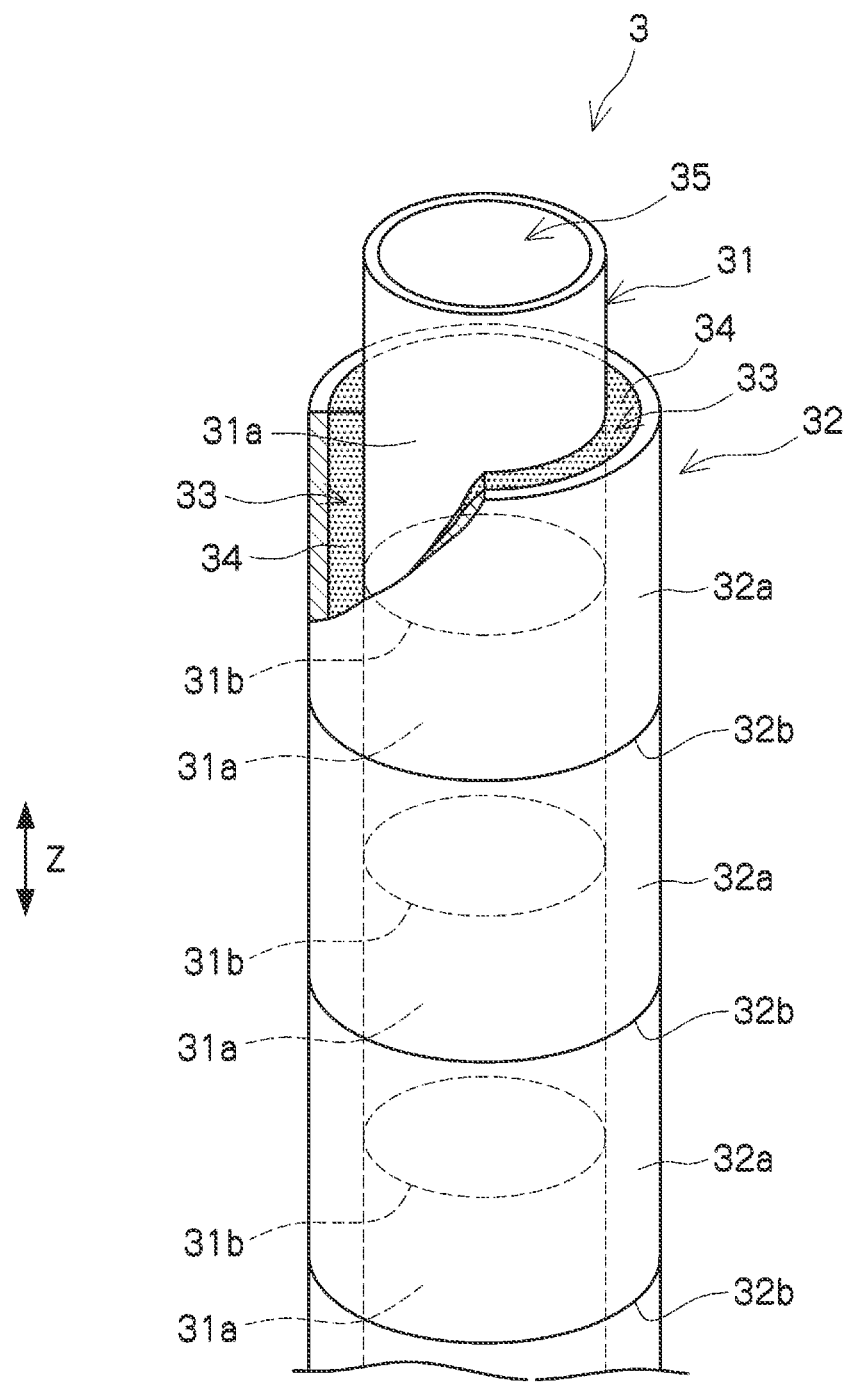
FIG. 7 is a perspective view, in a partial cut away, showing an aspect in which a bent steel pipe is used for the inner pipe and an outer pipe, with regard to the floating body structure according to the first embodiment of the present invention.
Figure 8:
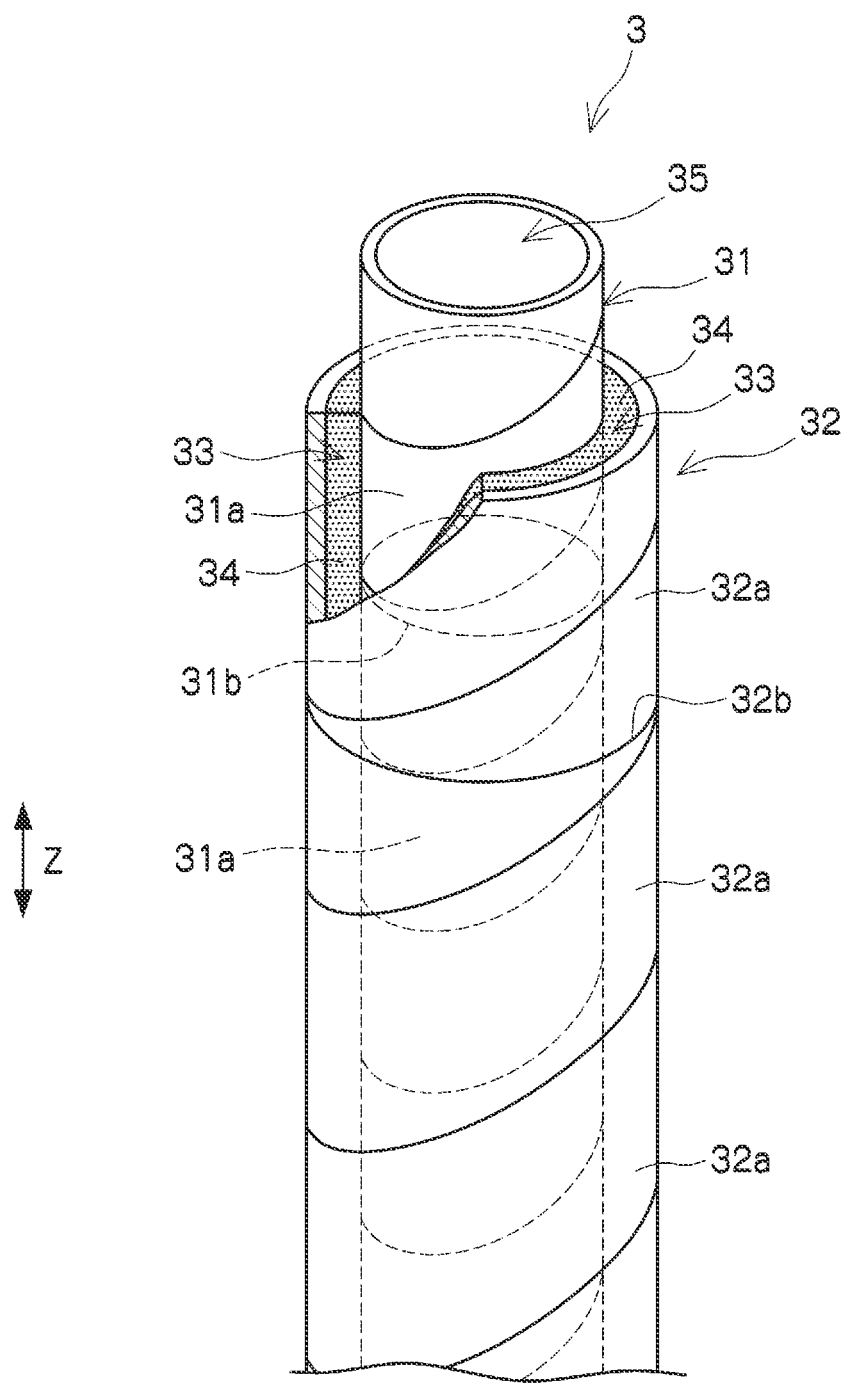
FIG. 8 is a perspective view, in a partial cut away, showing an aspect in which a spiral steel pipe is used for the inner pipe and the outer pipe, with regard to the floating body structure according to the first embodiment of the present invention.

As shown in FIGS. 7 and 8, the inner pipe 31 has first joint portions 31b which join a plurality of short steel pipes 31a for inner pipe each having a predetermined length, in a longitudinal direction Z of the floating body section 3. As shown in FIGS. 7 and 8, the outer pipe 32 has second joint portions 32b which join a plurality of short steel pipes 32a for outer pipe each having a predetermined length, in the longitudinal direction Z. As shown in FIG. 9, the first joint portion 31b and the second joint portion 32b are alternately disposed in the longitudinal direction Z.

As shown in FIG. 7, each of the steel pipe 31a for inner pipe and the steel pipe 32a for outer pipe may be a bent steel pipe obtained by bending and press-forming a steel sheet into a cylindrical shape. Otherwise, as shown in FIG. 8, each of the steel pipe 31a for inner pipe and the steel pipe 32a for outer pipe may be a spiral steel pipe obtained by press-forming a steel strip into a cylindrical shape by spirally bending the steel strip.

In addition, the inner pipe 31 need not be configured with the plurality of steel pipes 31a for inner pipe and may be configured with a single bent steel pipe obtained by press-forming a single steel sheet into a cylindrical shape, or a single spiral steel pipe obtained by press-forming a steel strip into a cylindrical shape by spirally bending the steel strip. Similarly, the outer pipe 32 also need not be configured with the plurality of steel pipes 32a for outer pipe and may be configured with a single bent steel pipe obtained by press-forming a single steel sheet into a cylindrical shape, or a single spiral steel pipe obtained by press-forming a steel strip into a cylindrical shape by spirally bending the steel strip.

In the floating body structure 1 according to this embodiment, the position of the first joint portion 31b of the inner pipe 31 is at a steel sheet portion of the outer pipe 32 at the same position in the longitudinal direction Z, and the position of the second joint portion 32b of the outer pipe 32 is at a steel sheet portion of the inner pipe 31 at the same position in the longitudinal direction Z. In this manner, the first joint portion 31b of the inner pipe 31 and the second joint portion 32b of the outer pipe 32 are alternately disposed in the longitudinal direction Z, and therefore, the first joint portion 31b of the inner pipe 31 and the second joint portion 32b of the outer pipe 32 are not present in the same cross section in the longitudinal direction Z. According to the floating body section 3 having such a structure, it is possible to disperse stress concentration of joint portions which would likely lower total strength if in the same cross section in the longitudinal direction Z, and as a result, it becomes possible to prevent the breakage of the floating body section 3. Further, even in a case where one of the inner pipe 31 and the outer pipe 32 is damaged, it becomes possible to secure the required structural strength of the floating body section 3 by the other of the inner pipe 31 and the outer pipe 32, which is not damaged. In this manner, the floating body section 3 has a fail-safe structure against overall breakage.

In the floating body structure 1 according to this embodiment, the floating body section 3 has a double pipe structure, whereby it is possible to reduce the sheet thickness of each steel pipe which is used as the steel pipe 31a for inner pipe and the steel pipe 32a for outer pipe, and as a result, it is possible to reduce the degree of difficulty of welding in the first joint portion 31b and the second joint portion 32b. Therefore, according to the floating body structure 1 according to this embodiment, it becomes possible to use high-strength steel as the steel pipe 31a for inner pipe and the steel pipe 32a for outer pipe.

Originally, in a case where a structure which is sunk under water was formed with a steel structure, the steel structure was configured with a relatively thin plate. For this reason, in a case where the steel structure is a rectangular structure, if water pressure acts from the side of the rectangular structure, a bending moment occurring in a steel sheet significantly increases. Even in a case where the steel structure has a circular cross-sectional shape, a large axial force acts on a steel sheet, and therefore, the sheet thickness becomes very large in order to secure structural strength against buckling.

However, in a case where the double pipe structure in which the gap 33 between the inner pipe 31 and the outer pipe 32 is filled with the concrete or mortar 34 or the like is adopted as the structure of the floating body section 3, water pressure generates a compressive force in the concrete or mortar 34. However, the compressive force acts as prestress, and therefore, the strength of the concrete or mortar 34 working as a structure is significantly improved.

In addition, the filled concrete or mortar 34 not only hardly generates bending stress in order to support the steel materials of the inner pipe 31 and the outer pipe 32 from the side, but also has the effect of limiting the occurrence of buckling by restraint, thereby being structurally very reasonable.

In the floating body structure 1 according to this embodiment, since the concrete or mortar 34 which is filled into the gap 33 counters stress which acts on the floating body section 3 in a compression direction, it is possible to reduce structural strength in the compression direction which is required for the steel pipe 31a for inner pipe and the steel pipe 32a for outer pipe. For this reason, in the floating body structure 1 according to this embodiment, it is sufficient if the inner pipe 31 and the outer pipe 32 are designed so as to secure structural strength in a tensile direction, and thus it is possible to reduce the amount of steel which is used for the steel pipe 31a for inner pipe and the steel pipe 32a for outer pipe. Further, in the floating body structure 1 according to this embodiment, the structural strength in the compression direction which is required for the steel pipe 31a for inner pipe and the steel pipe 32a for outer pipe is reduced, and therefore, even in a case where high-strength steel is used as the steel pipe 31a for inner pipe and the steel pipe 32a for outer pipe, it is possible to limit a reduction in buckling stress due to use of high-strength steel.

Figure 20:
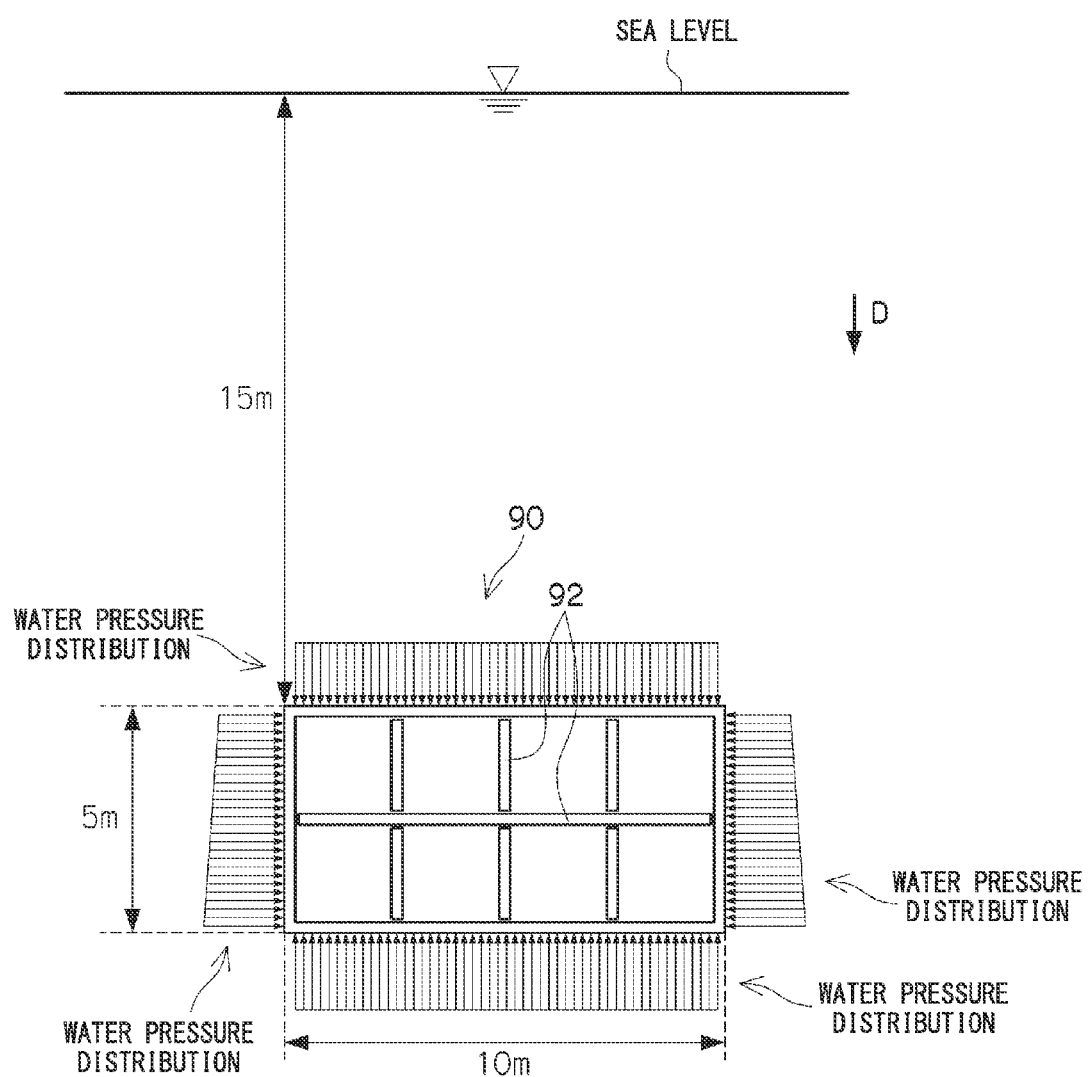
FIG. 20 is a distribution diagram of water pressure acting on a connection buoyancy section having a rectangular cross section in the related art.

Comparing the floating body structure 1 according to this embodiment with the connection buoyancy section 90 having a rectangular cross section of the related art shown in FIG. 20, in the connection buoyancy section 90 of the related art, it is necessary to provide the stiffener 92 perpendicular to a wall surface inside a wall in order to secure a predetermined structural strength. For this reason, a weight of steel of, for example, 22 tons/m is required. In contrast, in the floating body structure 1 according to this embodiment, it becomes possible to secure structural strength equivalent to that of the connection buoyancy section 90 of the related art with a weight of steel of 1.2 tons/m. For this reason, according to the floating body structure 1 according to this embodiment, it is possible to fabricate the floating body structure 1 with a used amount of steel of about 5%, as compared to the connection buoyancy section 90 having a rectangular cross section of the related art, and thus it becomes possible to provide a floating body type wind turbine power-generating facility at a significantly reduced manufacturing cost.

According to the floating body structure 1 according to this embodiment, in a case where a spiral steel pipe is used as the steel pipe 31a for inner pipe and the steel pipe 32a for outer pipe, it is possible to use a hot coil in the manufacturing of the steel pipe. As a result, it is possible to reduce the manufacturing cost of the steel pipe, as compared to a case of using a thick steel plate. Further, it is possible to make the lengths of the steel pipe 31a for inner pipe and the steel pipe 32a for outer pipe longer, and thus it is possible to significantly reduce the number of first joint portions 31b and the second joint portions 32b or completely eliminate the first joint portion 31b and the second joint portion 32b. For this reason, according to the floating body structure 1 of this embodiment, it is possible to significantly reduce the cost required for welding. In addition, according to the floating body structure 1 according to this embodiment, welding of the inner pipe 31 and the outer pipe 32 in the longitudinal direction Z is replaced by a spiral bead. The spiral bead is uniformly disposed over the entire length of the steel pipe, and therefore, the spiral bead very effectively functions as a shift stop for the concrete or mortar 34 which is filled in. Therefore, according to the floating body structure 1 according to this embodiment, the structural strength of the floating body section 3 is increased and it becomes possible to provide the floating body section 3 at a reduced manufacturing cost.

Figure 10A:
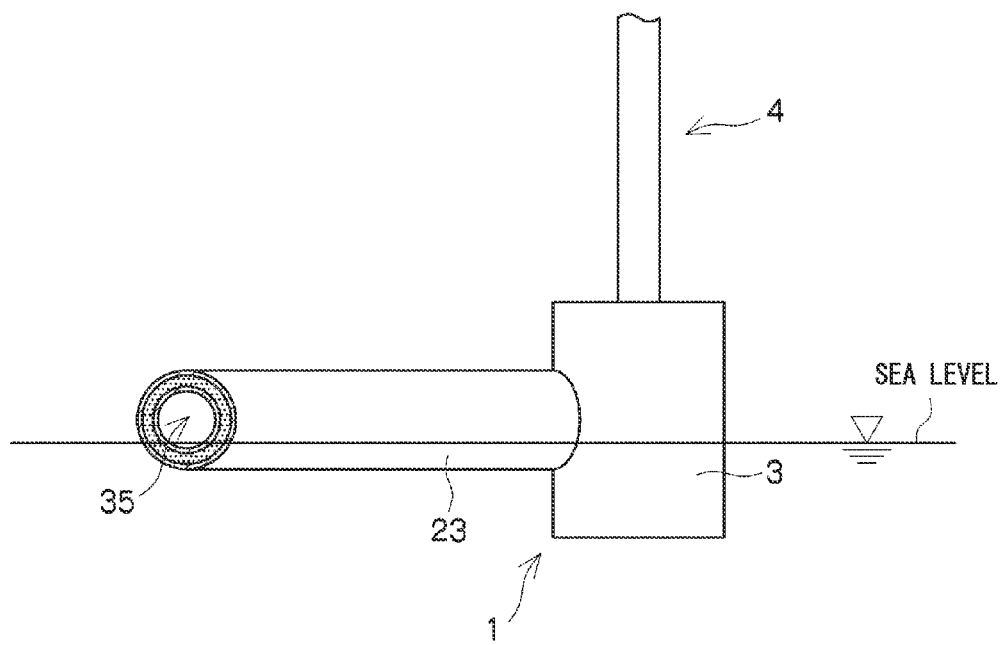
FIG. 10A is an explanatory diagram showing a state before the floating body structure according to the first embodiment of the present invention sinks under water.

As shown in FIG. 10A, in the floating body structure 1 according to this embodiment, by increasing the buoyancy of the floating body structure 1 by making the hollow portion 35 be in a hollow state, it is possible to tow the floating body structure 1 from the coast to deep water in a state where the floating body structure 1 is floated on the surface of the sea.

Figure 10B:
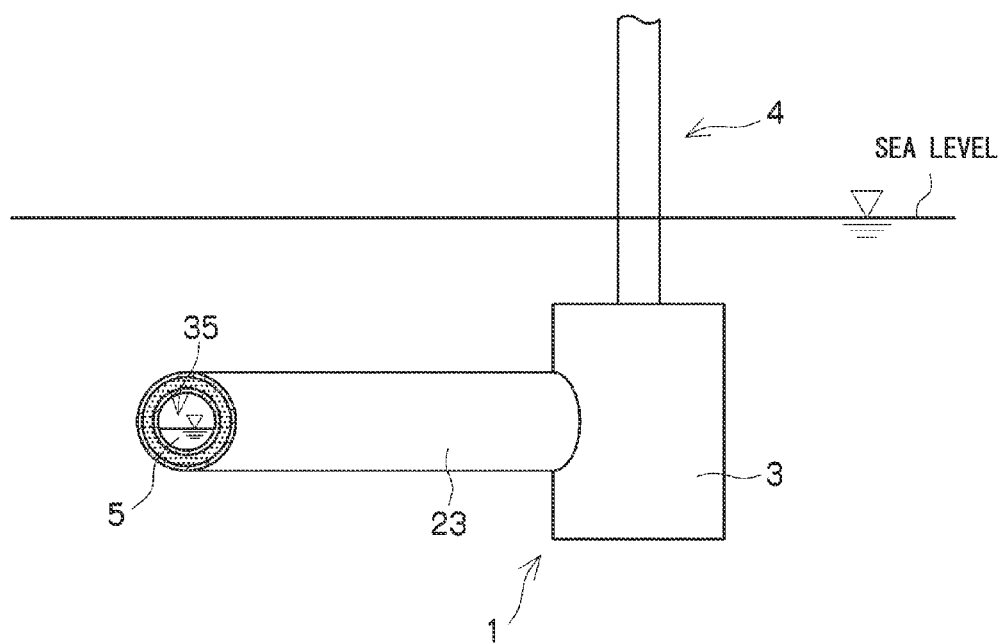
FIG. 10B is an explanatory diagram showing a state where the floating body structure according to the first embodiment of the present invention has sunk under water.

Further, as shown in FIG. 10B, in the floating body structure 1 according to this embodiment, by reducing the buoyancy of the floating body structure 1 by injecting seawater 5 or the like into the hollow portion 35 by using injection means (not shown) in deep water where the superstructure 4 is installed, it is possible to float the whole of the floating body structure 1 in water with it sunk under water at a predetermined water depth.

In addition, in the floating body structure 1 according to this embodiment, since the hollow portion 35 is formed and the inside of the floating body section 3 is not totally filled with concrete or the like, it becomes possible to obtain the buoyancy needed to float the floating body structure 1 at a predetermined water depth. In addition, according to the floating body structure 1 according to this embodiment, corrosion protection means (not shown) may be provided on the inner wall surface of the inner pipe 31 in order to prevent corrosion by the seawater 5 or the like injected into the hollow portion 35.

Further, it is also effective to inject powder or a fluid material such as slag, or a fluid solidified material such as mortar or concrete, instead of seawater, into the hollow portion 35 of the inner pipe 31.

In the floating body section 3, it is preferable that the gap 33 (the thickness of the concrete or mortar 34) between the outer wall surface of the inner pipe 31 and the inner wall surface of the outer pipe 32 is 600 mm or more, and it is preferable that at least a portion of the outer diameter of the outer pipe 32 is 6500 mm or more. This is because in a case of adopting a double pipe structure as the structure of the floating body section 3, it is realistically necessary for a worker to enter between the inner tube 31 and the outer tube 32 and perform work in a process of fabricating the floating body section 3.

Specifically, the floating body section 3 is fabricated by, for example, the following processes.

First, a plurality of steel pipes 31a for inner pipe are joined in series along a vertical direction on a horizontal plane (hereinafter referred to as a working surface) which is used to perform work of fabricating the floating body section 3, whereby the inner pipe 31 which is upright with respect to the working surface is fabricated. Subsequently, a plurality of steel pipes 32a for outer pipe are joined in series along the vertical direction, whereby the outer pipe 32 which is upright with respect to the working surface and accommodates the inner pipe 31 on the inside thereof is fabricated.

Subsequently, the space between the inner pipe 31 and the outer pipe 32 is filled with the concrete or mortar 34. At this time, it is necessary for a worker to enter between the inner pipe 31 and the outer pipe 32 and perform filling work. Subsequently, a longer inner pipe 31 is fabricated by joining a plurality of steel pipes 31a for inner pipe in series along the vertical direction with respect to the inner pipe 31 fabricated first. At this time, it is necessary for a worker to enter between the inner pipe 31 and the outer pipe 32 and perform joining work.

Subsequently, a longer outer pipe 32 is fabricated by joining a plurality of steel pipes 32a for outer pipe in series along the vertical direction with respect to the outer pipe 32 fabricated first. Also at this time, it is necessary for a worker to enter between the inner pipe 31 and the outer pipe 32 and perform joining work. Then, the space between the inner pipe 31 and the outer pipe 32 made longer is filled with the concrete or mortar 34. As described above, a floating body section 3 having a predetermined length is fabricated by repeating the process of sequentially filling the space between the inner pipe 31 and the outer pipe 32 with the concrete or mortar 34 while gradually extending the lengths of the inner pipe 31 and the outer pipe 32.

In this manner, it is necessary for a worker to enter between the inner pipe 31 and the outer pipe 32 and perform work in the process of fabricating the floating body section 3, and therefore, it is preferable that the gap 33 in the floating body section 3 is 600 mm or more, and it is preferable that at least a portion of the outer diameter of the outer pipe 32 is 6500 mm or more. On the other hand, in a case of using dimensions less than the above-described dimensions, the strength of the joint portion of each of the inner pipe 31 and the outer pipe 32 is reduced, and therefore, it is necessary to add reinforcement parts to the inside of the inner pipe 31 and the outside of the outer pipe 32. However, it is not preferable to install the reinforcement parts on the outside of the outer pipe 32 in terms of external appearance and corrosion protection.

The inventor of this application calculated a sheet thickness, a generated stress, a ballast amount, and a steel weight in a case of supporting a wind turbine power-generating facility by using the floating body section 3 having a double pipe structure and a case of supporting the same wind turbine power-generating facility by using a floating body section having a general single pipe structure of the related art, by simulation. The calculation results are shown in Table 1.

Figure 11:
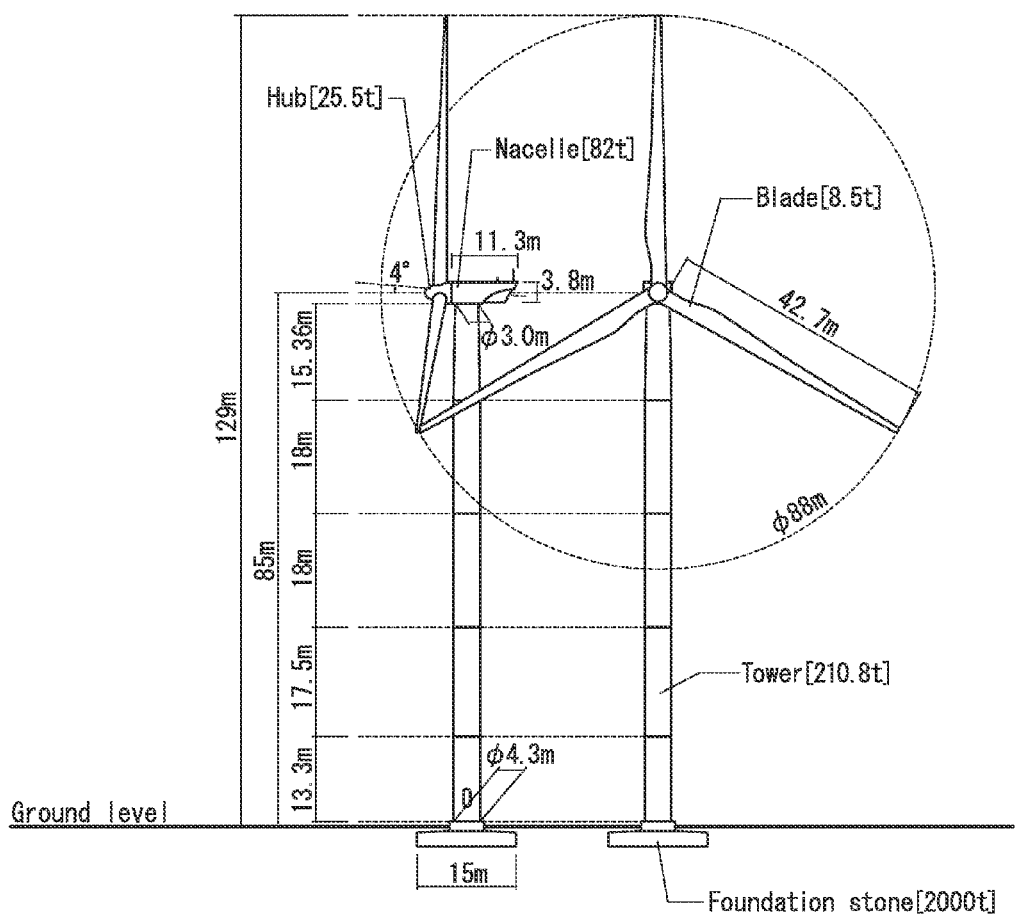
FIG. 11 is a schematic diagram showing a 2.5 MW-grade wind turbine power-generating facility assumed as an object to be supported in simulation for verifying the effects of the present invention.

In addition, as shown in FIG. 11, in the simulation, a 2.5 MW-grade wind turbine power-generating facility was assumed as an object to be supported. Further, in the simulation, the weight of a section on water was set to be 550 tons such that the weight of a submerged section (including ballast) of the entire structure which includes the wind turbine power-generating facility and the floating body section became greater than or equal to ten times the weight of the section on water and the buoyancy and the total weight of the entire structure balanced each other, and the diameter of the floating body section was set to be 9 m, and the length of the floating body section was set to be 90 m. In addition, the reason why the weight of the submerged section is set to ten times or more the weight of the section on water is because it is the estimate of a weight ratio in which it is possible to obtain stability as a floating body. Here, the above-mentioned ballast is a heavy load which is filled into an internal space of the floating body section in order to adjust the weight balance of the entire structure such that the weight of the submerged section becomes ten times or more the weight of the section on water and to make the buoyancy and the total weight of the entire structure balance each other.

Further, in the simulation, a design strength of an upper end portion of the floating body section was designed so as to be larger than a load which is generated due to a moment which is transmitted from a steel pipe, and a lower end portion of the floating body section was designed so as to be able to withstand water pressure. An allowable stress was set to be a value which is obtained by dividing yield strength by a safety factor of 1.5. A case of using SM490 as steel was assumed. The Young's modulus ratio of concrete and steel was set to be 7.

TABLE 1

|  | Single pipe structure | Double pipe structure |
| --- | --- | --- |
| Sheet thickness | 25 mm | steel: each of outer pipe and inner pipe: 6 mm concrete: 700 mm |
| Generated stress | 176 MPa | steel: 22 MPa concrete: 3 MPa |
| Amount of ballast | 3335 tons | 995 tons |
| Steel weight | 500 tons in only outer wall skin plate. 1000 tons if the steel weight of a stiffening structure, a bulkhead, and the like is added. | 224 tons (including bottom plate of 6 mm) |
| Evaluation | The amount of ballast is very large and the weight is insufficient. Since the thickness of 25 mm is relatively thin with respect to the outer diameter of 9 m, it is necessary to provide stiffeners in a single pipe at a high density. | Since the generated stress is very small, almost no increase in sheet thickness is required even with a further increase in size. |

As shown in Table 1, in a case of supporting the 2.5 MW-grade wind turbine power-generating facility by using the floating body section having the general single pipe structure of the related art, it was found that the amount of ballast was very large and the weight was insufficient. Further, in a case where the diameter of the floating body section was 9 m, the sheet thickness was 25 mm, and therefore, it was found that in order to obtain the necessary structural strength, it was necessary to provide stiffeners in the single pipe at a high density.

In contrast, in a case of supporting the 2.5 MW-grade wind turbine power-generating facility by using the floating body section 3 having the double pipe structure, since the generated stress was very small, it was found that almost no increase in sheet thickness was required even with a further increase in size and the necessary structural strength was obtained.

As described above, according to the floating body structure 1 according to this embodiment, it becomes possible to provide the floating body section 3 in which structural strength capable of countering water pressure is secured without increasing the used amount of steel or the like, even in a case where the whole is sunk under water and floated in water at a predetermined water depth in order to reduce the influence of sea waves.

Next, a floating body structure 1A according to a second embodiment of the present invention will be described in detail with reference to the drawings. In addition, in the following second embodiment, the same constituent elements as the constituent elements in the first embodiment described above are denoted by the same reference numerals, and a description thereof is omitted below.

Figure 12:
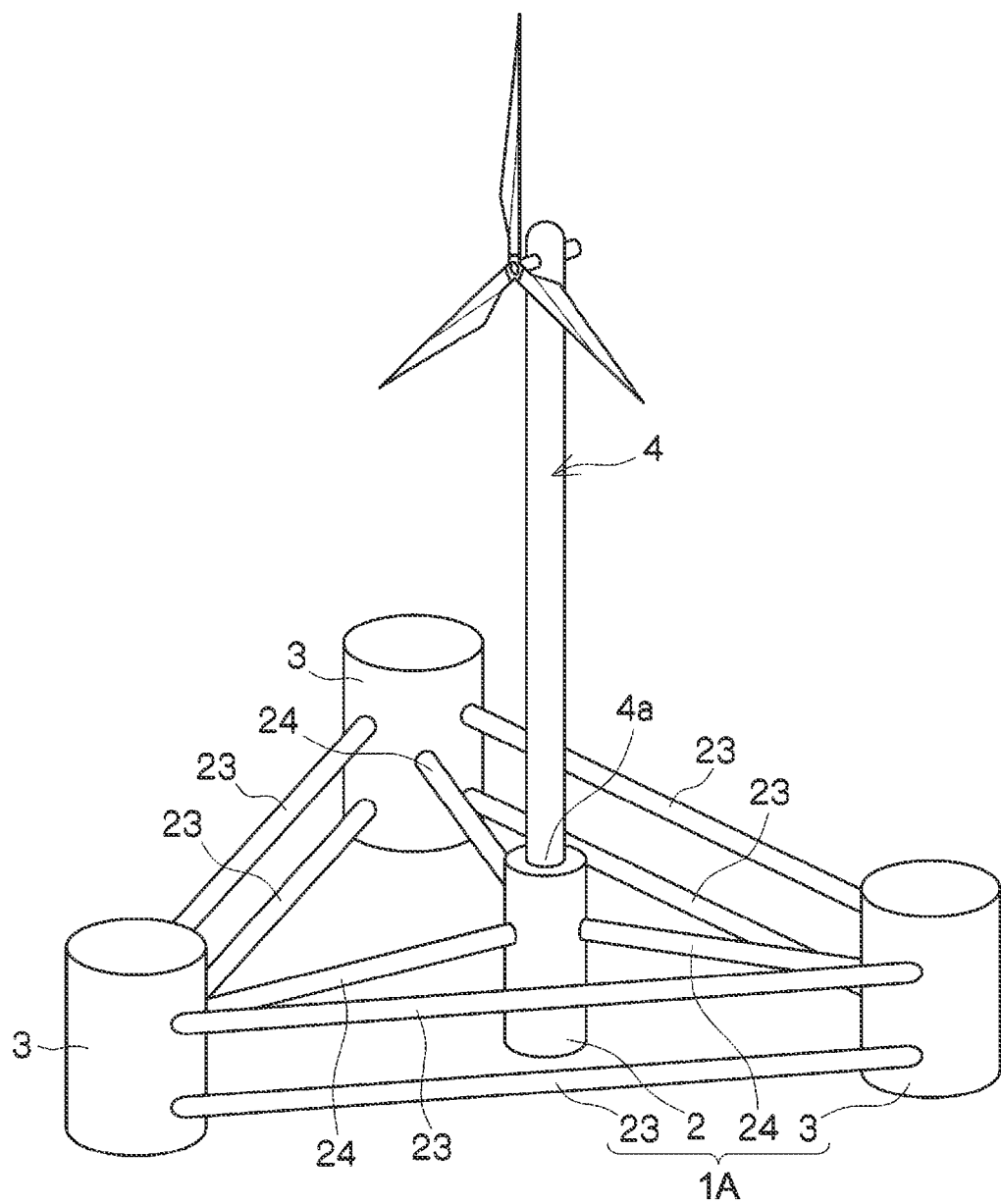
FIG. 12 is a perspective view schematically showing the configuration of a floating body type wind turbine power-generating facility provided with a floating body structure according to a second embodiment of the present invention.

As shown in FIG. 12, for example, the floating body structure 1A according to the second embodiment includes: a single superstructure support 2 configured to support a single superstructure 4; the three floating body sections 3 which are provided on the side of the superstructure support 2; the floating body connecting sections 23 connecting the three floating body sections 3 to each other; and support connecting sections 24 connecting the superstructure support 2 and the floating body sections 3. The floating body structure 1A is moored at a predetermined location in water by a mooring cable (not shown).

The superstructure support 2 also has a double pipe structure, similar to the floating body section 3. That is, the superstructure support 2 has a structure in which the inner pipe 31 is continuous with the superstructure 4 (a structure in which the inner pipe 31 is an extended portion of the base end portion 4a of the superstructure 4) or a structure in which the base end portion 4a of the superstructure 4 is inserted into the inside (the hollow portion 35) of the inner pipe 31.

Figure 13:
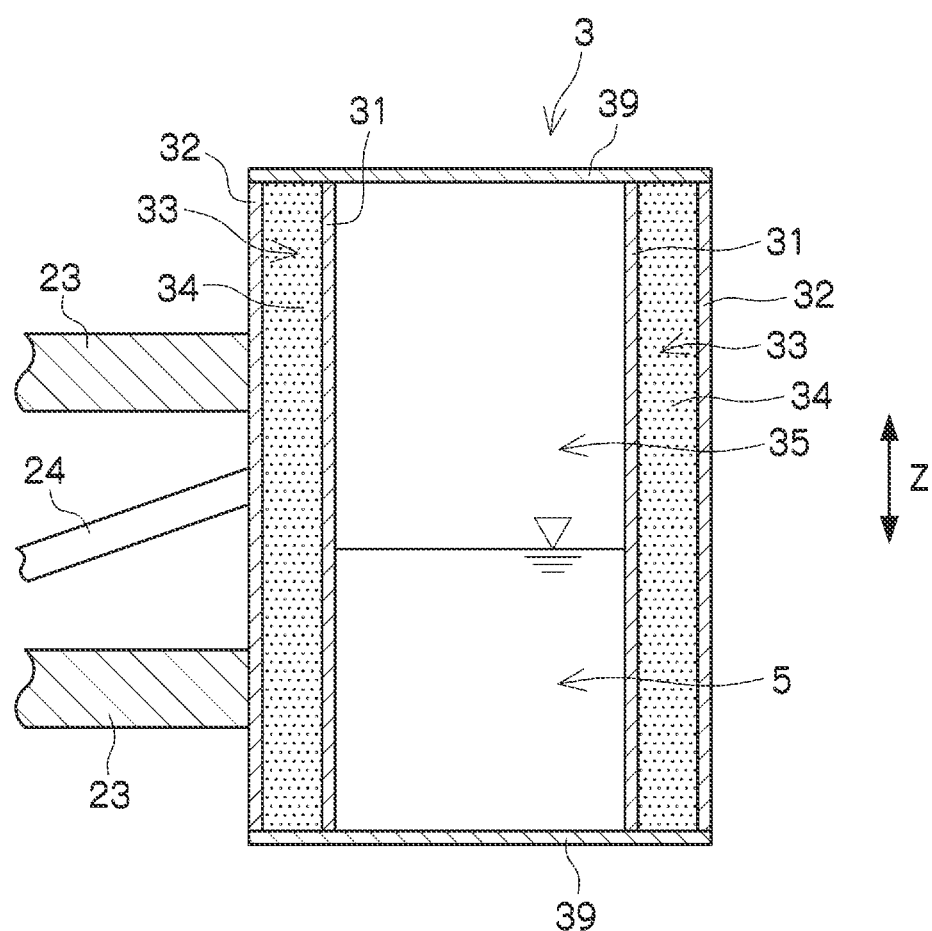
FIG. 13 is a longitudinal cross-sectional side view showing a floating body section of the floating body structure according to the second embodiment of the present invention.

As shown in FIG. 13, the floating body section 3 has a substantially cylindrical double pipe structure having the substantially cylindrical inner pipe 31 made of steel, which is provided on the inside, and the substantially cylindrical outer pipe 32 made of steel, which is provided on the outside. The up-down direction of the floating body section 3 is the longitudinal direction Z. The floating body section 3 is hermetically sealed in a state where at least a portion (in FIG. 13, the whole as an example) of the gap 33 formed between the outer wall surface of the inner pipe 31 and the inner wall surface of the outer pipe 32 is filled with the concrete or mortar 34. The floating body section 3 has the hollow portion 35 formed on the inside by the inner wall surface of the inner pipe 31. Each of the upper end of the floating body section 3 and the lower end of the floating body section 3 is closed by the lid body 39.

As shown in FIG. 13, the floating body structure 1A according to the second embodiment can be sunk in water by reducing the buoyancy of the floating body structure 1A by injecting the seawater 5 or the like into the hollow portion 35 of the floating body section 3 by using injection means (not shown) in deep water where the superstructure 4 is installed.

According to the floating body structure 1A of the second embodiment as described above, it is possible to secure structural strength capable of countering water pressure without increasing the used amount of steel or the like even in a case where the whole of the floating body structure 1A is sunk and floated in water at a predetermined water depth in order to reduce the influence of sea waves, and it becomes possible to obtain the buoyancy needed to float the floating body structure 1A at a predetermined water depth.

Next, a floating body structure 1B according to a third embodiment will be described in detail with reference to the drawings. In addition, in the following third embodiment, the same constituent elements as the constituent elements in the first and second embodiments described above are denoted by the same reference numerals, and a description thereof is omitted below.

Figure 14:
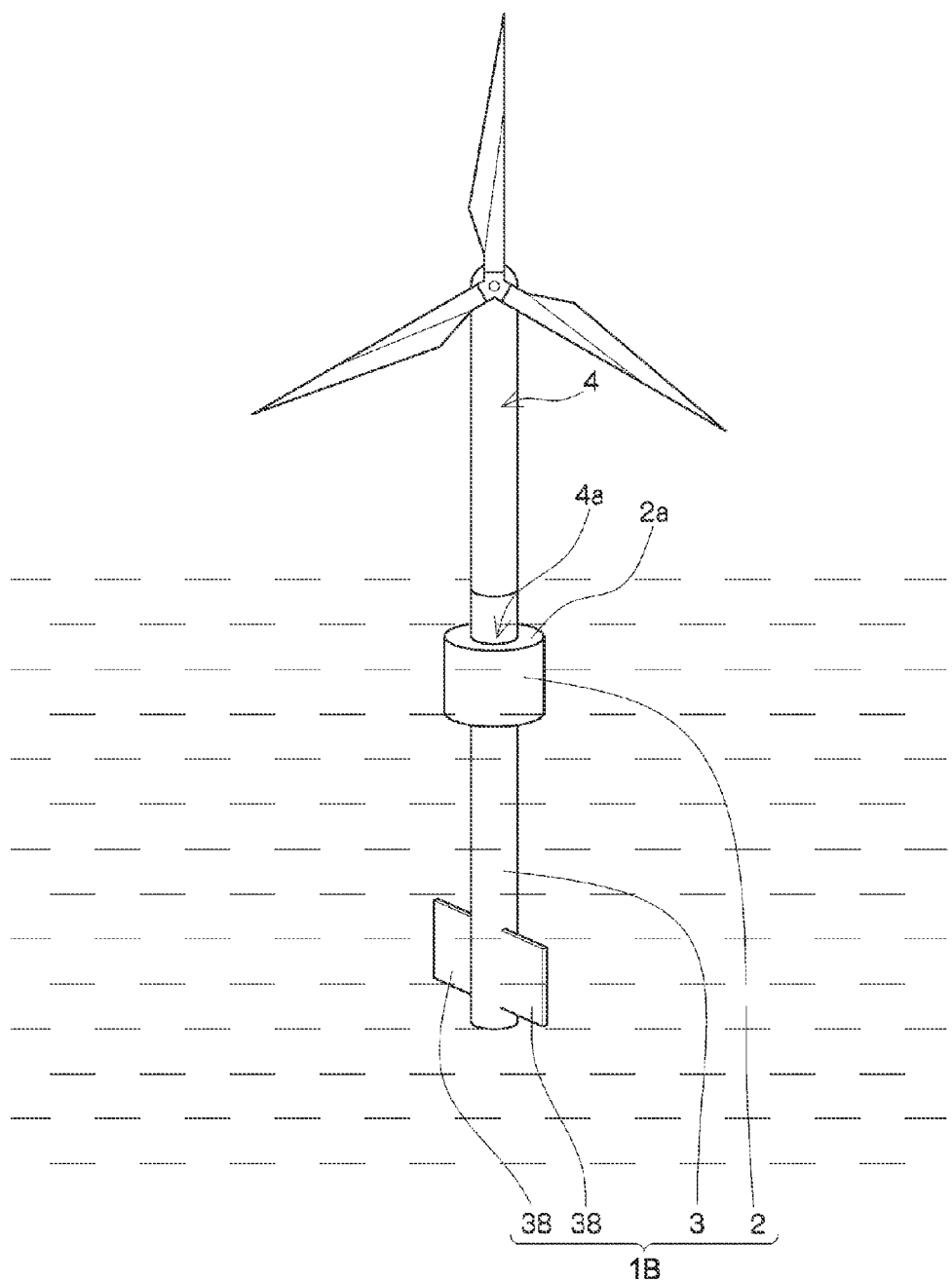
FIG. 14 is a perspective view schematically showing the configuration of a floating body type wind turbine power-generating facility provided with a floating body structure according to a third embodiment of the present invention.

As shown in FIG. 14, for example, the floating body structure 1B includes: the single superstructure support 2 configured to support the single superstructure 4; the floating body section 3 provided below the superstructure support 2; and a plurality of fins 38 which are provided on the lower side of the floating body section 3 for balancing the superstructure 4 and the floating body structure 1B in the sea. The floating body structure 1B is moored at a predetermined location in water by a mooring cable (not shown).

Figure 15:
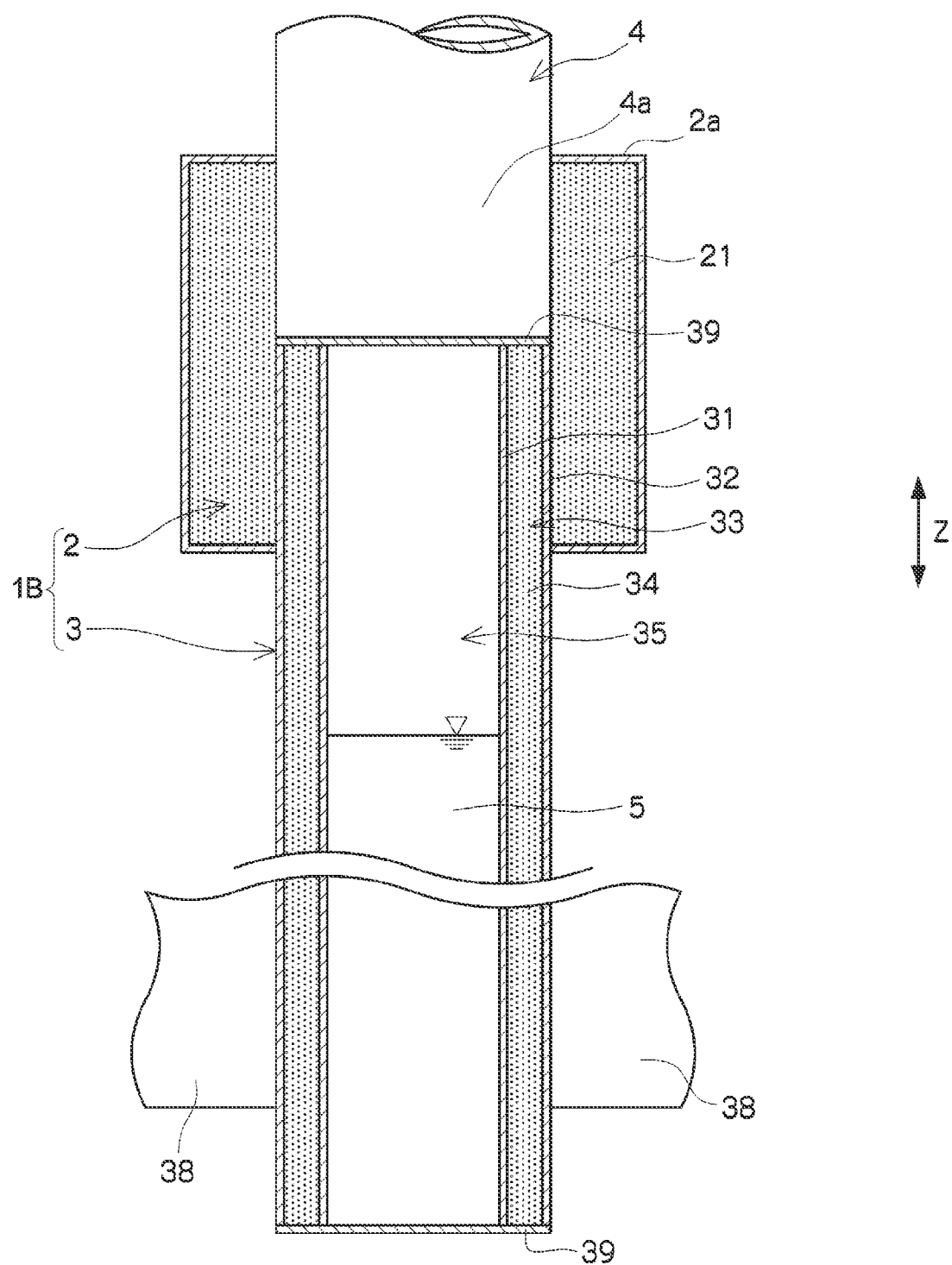
FIG. 15 is a longitudinal cross-sectional side view showing a state where a superstructure support which supports a superstructure is mounted on a floating body section, with regard to the floating body structure according to the third embodiment of the present invention.

As shown in FIG. 15, the superstructure support 2 has a substantially cylindrical concrete block body 21. In the superstructure support 2, the base end portion 4a of the superstructure 4 is mounted in an upper end portion 2a having a substantially circular planar shape. Due to such a structure, the superstructure support 2 supports the superstructure 4.

As shown in FIG. 15, the floating body section 3 has a substantially cylindrical double pipe structure having the substantially cylindrical inner pipe 31 made of steel, which is provided on the inside, and the substantially cylindrical outer pipe 32 made of steel, which is provided on the outside. The up-down direction of the floating body section 3 is the longitudinal direction Z. The floating body section 3 is hermetically sealed in a state where at least a portion (in FIG. 15, the whole as an example) of the gap 33 formed between the outer wall surface of the inner pipe 31 and the inner wall surface of the outer pipe 32 is filled with the concrete or mortar 34. The floating body section 3 has the hollow portion 35 formed on the inside by the inner wall surface of the inner pipe 31.

As shown in FIG. 15, the floating body structure 1B according to the third embodiment can be sunk in water by reducing the buoyancy of the floating body structure 1B by injecting the seawater 5 or the like into the hollow portion 35 of the floating body section 3 by using injection means (not shown) in deep water where the superstructure 4 is installed.

According to the floating body structure 1B of the third embodiment as described above, it is possible to secure structural strength capable of countering water pressure without increasing the used amount of steel or the like even in a case where the whole is sunk under water and floated in water at a predetermined water depth in order to reduce the influence of sea waves, and it becomes possible to obtain the buoyancy needed to float the floating body structure 1B at a predetermined water depth.

Figure 16A:
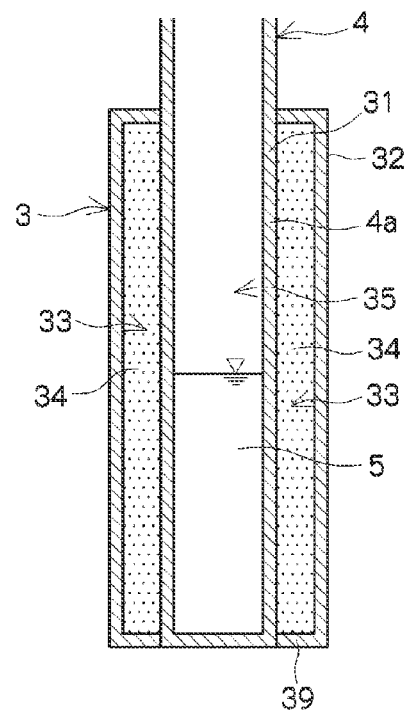
FIG. 16A is a longitudinal cross-sectional side view showing a state where the superstructure is mounted on the floating body section (a diagram showing a case where the inner pipe is continuous with the superstructure), with regard to the floating body structure according to the third embodiment of the present invention.
Figure 16B:
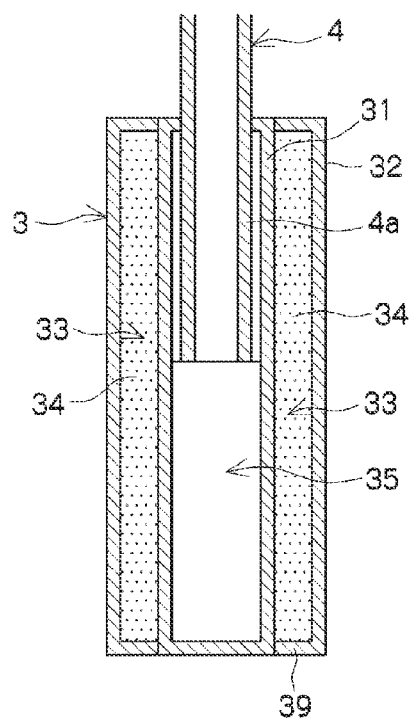
FIG. 16B is a longitudinal cross-sectional side view showing a state where the superstructure is mounted on the floating body section (a diagram showing a case where the superstructure is inserted into the inner pipe), with regard to the floating body structure according to the third embodiment of the present invention.

In addition, as shown in FIG. 16A, the superstructure 4 in the third embodiment may have a structure in which the superstructure 4 is continuous with the inner pipe 31 of the floating body section 3 having a double pipe structure (a structure in which the inner pipe 31 is the extended portion of the base end portion 4a of the superstructure 4). Further, as shown in FIG. 16B, the superstructure 4 in the third embodiment may have a structure in which the base end portion 4a is inserted into the inside (the hollow portion 35) of the inner pipe 31 of the floating body section 3 having a double pipe structure. In the case of the structure shown in FIG. 16B, the superstructure 4 and the inner pipe 31 may be joined to each other by filling the space between the superstructure 4 and the inner pipe 31 with mortar or concrete. Otherwise, in the case of the structure shown in FIG. 16B, the superstructure 4 and the inner pipe 31 may be joined to each other by using bolts or welding.

Next, a floating body structure 1C according to a fourth embodiment of the present invention will be described in detail with reference to the drawings. In addition, in the following fourth embodiment, the same constituent elements as the constituent elements in the first to third embodiments described above are denoted by the same reference numerals, and a description thereof is omitted below.

Figure 17:
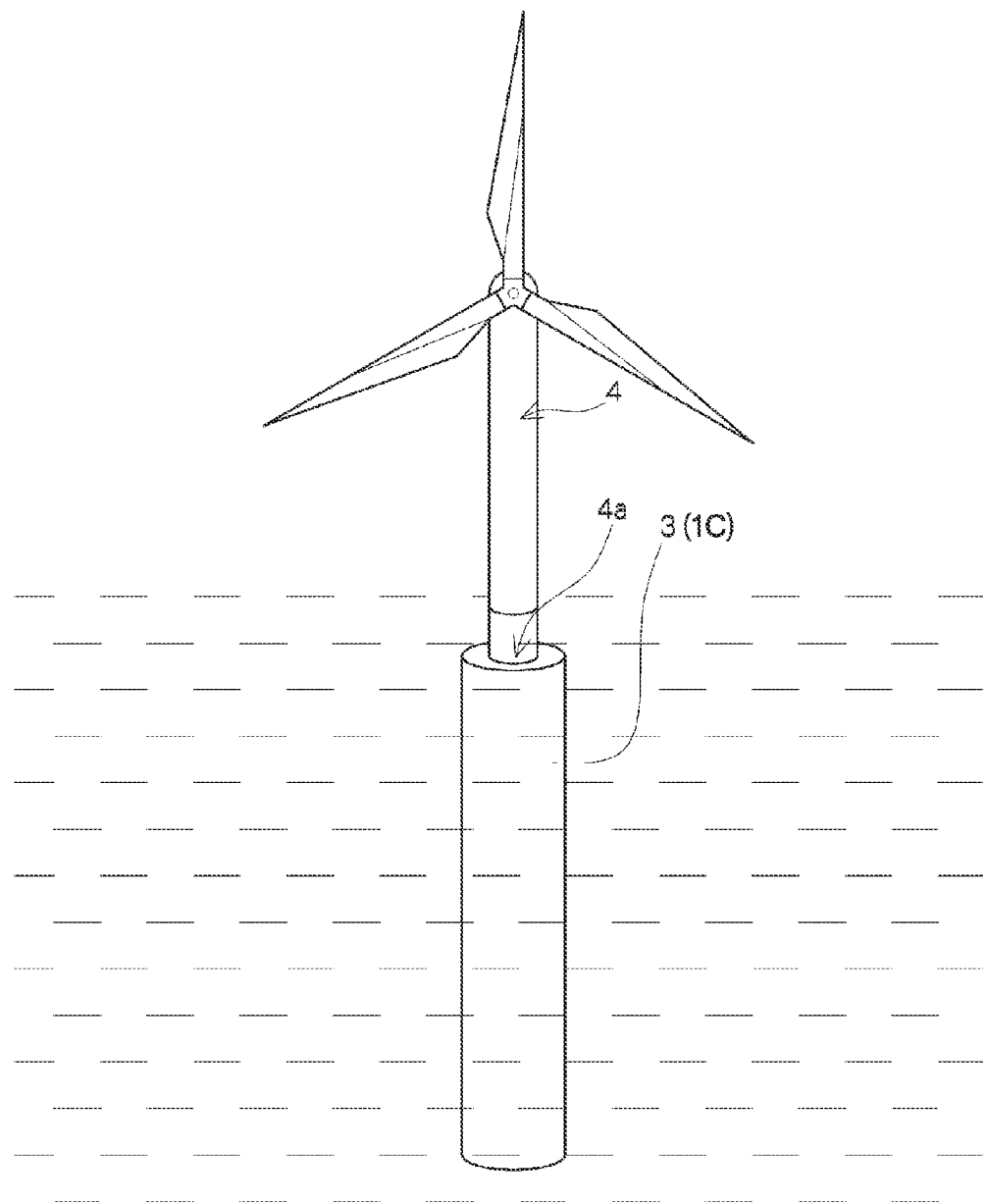
FIG. 17 is a perspective view schematically showing the configuration of a floating body type wind turbine power-generating facility provided with a floating body structure according to a fourth embodiment of the present invention.

As shown in FIG. 17, for example, the floating body structure 1C according to the fourth embodiment includes the single floating body section 3 configured to support the single superstructure 4. The floating body structure 1C is moored at a predetermined location in water by a mooring cable (not shown).

Figure 18:
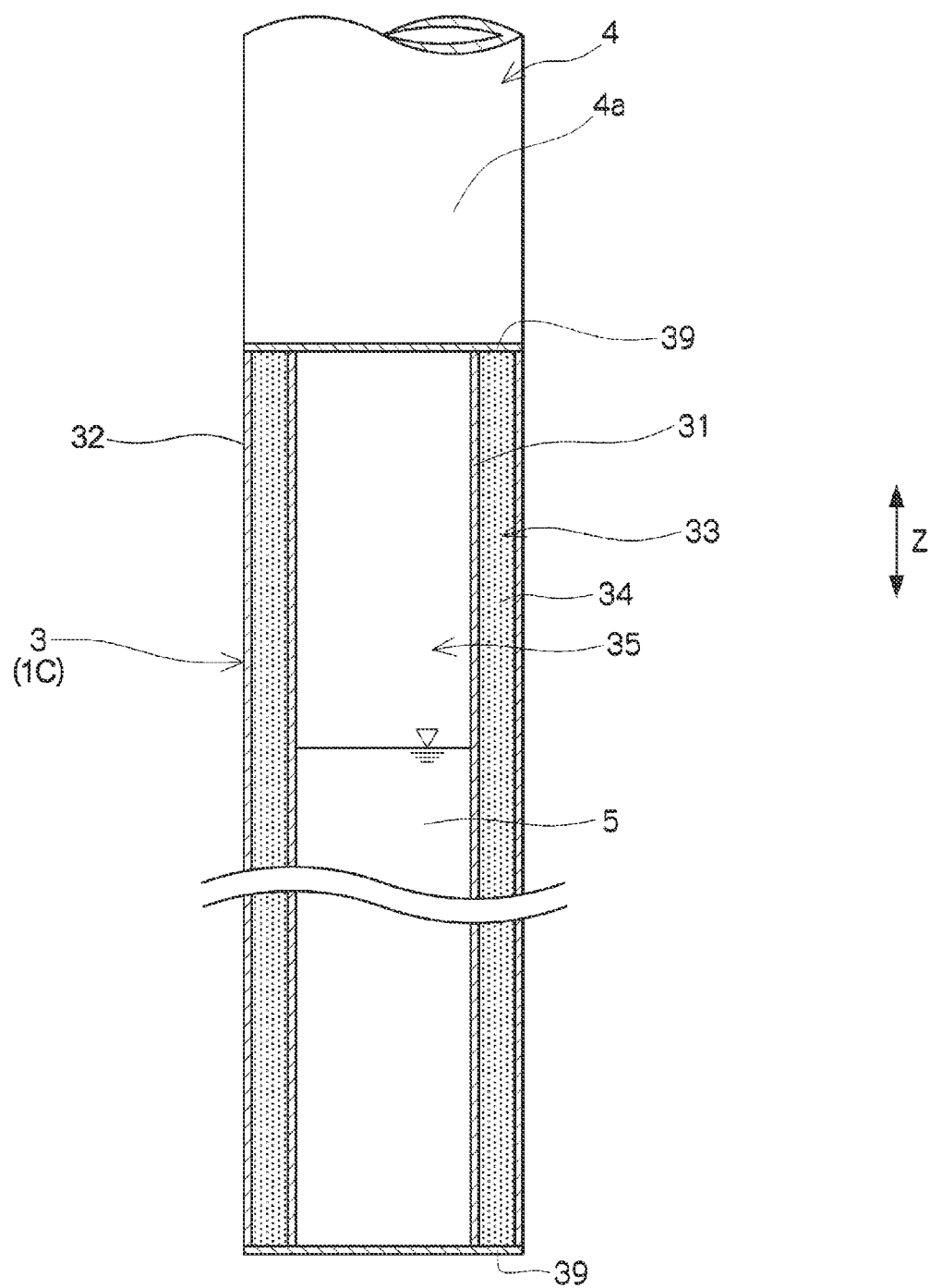
FIG. 18 is a longitudinal cross-sectional side view showing a state where the superstructure is mounted on a floating body section, with regard to the floating body structure according to the fourth embodiment of the present invention.

As shown in FIG. 18, the floating body section 3 has a substantially cylindrical double pipe structure having the substantially cylindrical inner pipe 31 made of steel, which is provided on the inside, and the substantially cylindrical outer pipe 32 made of steel, which is provided on the outside. The up-down direction of the floating body section 3 is the longitudinal direction Z. The floating body section 3 is hermetically sealed in a state where at least a portion (in FIG. 18, the whole as an example) of the gap 33 formed between the outer wall surface of the inner pipe 31 and the inner wall surface of the outer pipe 32 is filled with the concrete or mortar 34. The floating body section 3 has the hollow portion 35 formed on the inside by the inner wall surface of the inner pipe 31.

As shown in FIG. 18, the floating body structure 1C according to the fourth embodiment can be sunk under water by reducing the buoyancy of the floating body structure 1C by injecting the seawater 5 or the like into the hollow portion 35 of the floating body section 3 by using injection means (not shown) in deep water where the superstructure 4 is installed.

According to the floating body structure 1C of the fourth embodiment as described above, it is possible to secure structural strength capable of countering water pressure without increasing the used amount of steel or the like even in a case where the whole of the floating body structure 1C is sunk under water and floated in water at a predetermined water depth in order to reduce the influence of sea waves, and it becomes possible to obtain the buoyancy needed to float the floating body structure 1C at a predetermined water depth.

Further, the floating body structure 1C according to the fourth embodiment can be raised up from a state of lying sideways, by a crane or injection into the hollow portion 35. The floating body section 3 has very large flexural strength because of being a double pipe structure filled with the concrete or mortar 34. Further, even in a case where cracks are generated in the concrete or mortar 34 filled into the floating body section 3 while the floating body structure 1C is raised up, since the concrete or mortar 34 is completely covered with steel and does not come into direct contact with water, a durability problem does not occur.

In addition, the superstructure 4 in the fourth embodiment may have a structure in which the superstructure 4 is continuous with the inner pipe 31 of the floating body section 3 having a double pipe structure (a structure in which the inner pipe 31 is the extended portion of the base end portion 4a of the superstructure 4) (refer to FIG. 16A), similar to the third embodiment. Further, the superstructure 4 in the fourth embodiment may have a structure in which the base end portion 4a is inserted into the inside (the hollow portion 35) of the inner pipe 31 of the floating body section 3 having a double pipe structure (refer to FIG. 16B), similar to the third embodiment.

The first to fourth embodiments of the present invention have been described above. However, the superstructure 4 and the floating body section 3 may not be connected such that the central axis of the superstructure 4 and the central axis of the floating body section 3 (that is, the central axis of the inner pipe 31 and the outer pipe 32) necessarily coincide with each other, as described in each of the above-described embodiments.

Figure 19:
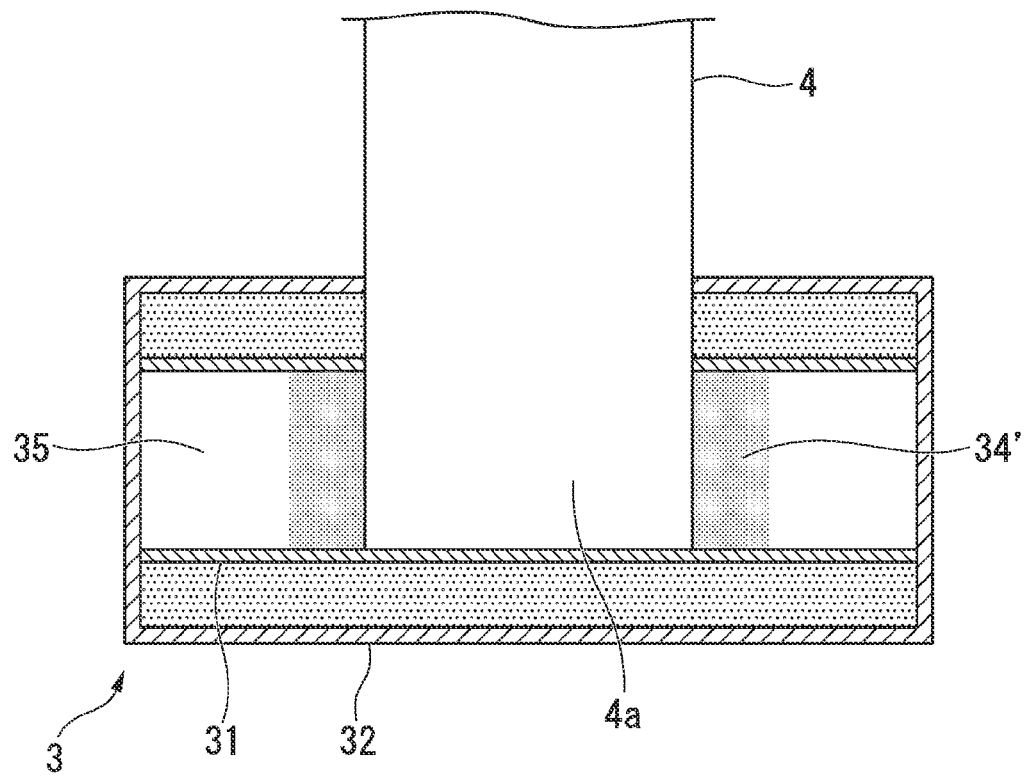
FIG. 19 is an explanatory diagram showing a state where a base end portion of the superstructure penetrates toward the inside of the inner pipe from the outside in a radial direction of the inner pipe and the outer pipe.

For example, as shown in FIG. 19, the base end portion 4a of the superstructure 4 may penetrate toward the inside of the inner pipe 31 from the outside in the radial direction of the inner pipe 31 and the outer pipe 32. In other words, the superstructure 4 and the floating body section 3 may be connected to each other so that the central axis of the superstructure 4 and the central axis of the floating body section 3 are orthogonal to each other. As shown in FIG. 19, the superstructure 4 may be fixed to the floating body section 3 by filling the hollow portion 35 which is formed by the inner wall surface of the inner pipe 31 with concrete or mortar 34' at a position where the base end portion 4a penetrates.

The embodiments of the present invention have been described above in detail. However, all of the embodiments described above merely show examples of embodiment in carrying out the present invention, and the technical scope of the present invention should not be construed as being limited by these embodiments.

BRIEF DESCRIPTION OF THE REFERENCE SYMBOLS 1, 1A, 1B, 1C: floating body structure
2: superstructure support
2a: upper end portion of superstructure support
21: block body
23: floating body connecting section
24: support connecting section
3: floating body section
31: inner pipe
31a: steel pipe for inner pipe
31b: first joint portion
32: outer pipe
32a: steel pipe for outer pipe
32b: second joint portion
33: gap
34: concrete or mortar
35: hollow portion
38: fin
39: lid body
4: superstructure
4a: base end portion of superstructure
5: seawater
90: connection buoyancy section
Z: longitudinal direction

The invention claimed is:

1. A floating body structure that supports an object to be supported so that the object to be supported floats in the sea, comprising:
a floating body section connected to a base end portion of the object to be supported,
wherein the floating body section has a lid body made of steel, an outer pipe made of steel, and an inner pipe made of steel and provided inside the outer pipe, and
the floating body section is hermetically sealed by the lid body in a state where at least a portion of a gap formed between an outer wall surface of the inner pipe and an inner wall surface of the outer pipe is filled with concrete or mortar,
the inner pipe has a first joint portion that joins a plurality of steel pipes for inner pipe each having a predetermined length along a longitudinal direction of the floating body section,
the outer pipe has a second joint portion that joins a plurality of steel pipes for outer pipe each having a predetermined length along with the longitudinal direction, and
the first joint portion and the second joint portion are alternately disposed in the longitudinal direction.

2. The floating body structure according to claim 1, wherein each of the steel pipe for inner pipe and the steel pipe for outer pipe is a spiral steel pipe obtained by press-forming a steel strip into a cylindrical shape by spirally bending the steel strip.

3. A floating body structure that supports an object to be supported so that the object to be supported floats in the sea, comprising,
a floating body section connected to a base end portion of the object to be supported, wherein
the floating body section has a lid body made of steel, an outer pipe made of steel, and an inner pipe made of steel and provided inside the outer pipe,
the floating body section is hermetically sealed by the lid body in a state where at least a portion of a gap formed between an outer wall surface of the inner pipe and an inner wall surface of the outer pipe is filled with concrete or mortar,
each of the inner pipe and the outer pipe is a spiral steel pipe obtained by press-forming a steel strip into a cylindrical shape by spirally bending the steel strip.

4. A floating body structure that supports an object to be supported so that the object to be supported floats in the sea, comprising,
a floating body section connected to a base end portion of the object to be supported, wherein
the floating body section has a lid body made of steel, an outer pipe made of steel, and an inner pipe made of steel and provided inside the outer pipe,
the floating body section is hermetically sealed by the lid body in a state where at least a portion of a gap formed between an outer wall surface of the inner pipe and an inner wall surface of the outer pipe is filled with concrete or mortar,
the base end portion of the object to be supported penetrates toward the inside of the inner pipe from the outside in a radial direction of the inner pipe and the outer pipe, and
a hollow portion which is formed by an inner wall surface of the inner pipe is filled with concrete or mortar at a position where the base end portion penetrates.

5. The floating body structure according to claim 4, wherein
the inner pipe has a first joint portion that joins a plurality of steel pipes for inner pipe each having a predetermined length along a longitudinal direction of the floating body section,
the outer pipe has a second joint portion that joins a plurality of steel pipes for outer pipe each having a predetermined length along the longitudinal direction, and
the first joint portion and the second joint portion are alternately disposed in the longitudinal direction.

6. The floating body structure according to claim 5, wherein each of the steel pipe for inner pipe and the steel pipe for outer pipe is a spiral steel pipe obtained by press-forming a steel strip into a cylindrical shape by spirally bending the steel strip.

7. The floating body structure according to claim 4, wherein each of the inner pipe and the outer pipe is a spiral steel pipe obtained by press-forming a steel strip into a cylindrical shape by spirally bending the steel strip.

8. The floating body structure according to claim 1, wherein the inner pipe is an extended portion of the base end portion of the object to be supported.

9. The floating body structure according to claim 3, wherein the inner pipe is an extended portion of the base end portion of the object to be supported.

10. The floating body structure according to claim 1, wherein
the base end portion of the object to be supported is inserted into the inner pipe, and
a hollow portion which is formed by an inner wall surface of the inner pipe is filled with concrete or mortar at a position where the base end portion is inserted.

11. The floating body structure according to claim 1, wherein
a plurality of the floating body sections are provided, and
the plurality of floating body sections are connected to each other by a floating body connecting section.

12. The floating body structure according to claim 1, wherein
the gap between the outer wall surface of the inner pipe and the inner wall surface of the outer pipe is 600 mm or more, and
at least a portion of an outer diameter of the outer pipe is 6500 mm or more.

13. The floating body structure according to claim 4, wherein the inner pipe is an extended portion of the base end portion of the object to be supported.

14. The floating body structure according to claim 3, wherein
the base end portion of the object to be supported is inserted into the inner pipe, and
a hollow portion which is formed by an inner wall surface of the inner pipe is filled with concrete or mortar at a position where the base end portion is inserted.

15. The floating body structure according to claim 4, wherein
the base end portion of the object to be supported is inserted into the inner pipe, and
a hollow portion which is formed by an inner wall surface of the inner pipe is filled with concrete or mortar at a position where the base end portion is inserted.

16. The floating body structure according to claim 3, wherein
a plurality of the floating body sections are provided, and
the plurality of floating body sections are connected to each other by a floating body connecting section.

17. The floating body structure according to claim 4, wherein
a plurality of the floating body sections are provided, and
the plurality of floating body sections are connected to each other by a floating body connecting section.

18. The floating body structure according to claim 3, wherein
the gap between the outer wall surface of the inner pipe and the inner wall surface of the outer pipe is 600 mm or more, and
at least a portion of an outer diameter of the outer pipe is 6500 mm or more.

19. The floating body structure according to claim 4, wherein
the gap between the outer wall surface of the inner pipe and the inner wall surface of the outer pipe is 600 mm or more, and
at least a portion of an outer diameter of the outer pipe is 6500 mm or more.

* * * * *